(12) United States Patent
Schneiders et al.

(10) Patent No.: US 11,958,924 B2
(45) Date of Patent: Apr. 16, 2024

(54) PROCESS FOR PREPARING HNBR SOLUTIONS WITH ALTERNATIVE SOLVENTS

(71) Applicant: ARLANXEO DEUTSCHLAND GMBH, Dormagen (DE)

(72) Inventors: Karola Schneiders, Bergisch Gladbach (DE); Susanna Lieber, Kaiserslautern (DE); Sarah David, Dormagen (DE)

(73) Assignee: Arlanxeo Deutschland GmbH, Dormagen (DE)

( * ) Notice: Subject to any disclaimer, the term of this patent is extended or adjusted under 35 U.S.C. 154(b) by 240 days.

(21) Appl. No.: 17/414,688

(22) PCT Filed: Nov. 26, 2019

(86) PCT No.: PCT/EP2019/082538
§ 371 (c)(1),
(2) Date: Jun. 16, 2021

(87) PCT Pub. No.: WO2020/126345
PCT Pub. Date: Jun. 25, 2020

(65) Prior Publication Data
US 2022/0041780 A1 Feb. 10, 2022

(30) Foreign Application Priority Data
Dec. 17, 2018 (EP) .................... 18213114

(51) Int. Cl.
*C08F 236/12* (2006.01)
*C08C 19/02* (2006.01)
*C08F 2/06* (2006.01)
*C08F 4/80* (2006.01)

(52) U.S. Cl.
CPC ............ *C08F 236/12* (2013.01); *C08C 19/02* (2013.01); *C08F 2/06* (2013.01); *C08F 4/80* (2013.01)

(58) Field of Classification Search
CPC ...................................... C08C 19/02
See application file for complete search history.

(56) References Cited

U.S. PATENT DOCUMENTS

| | | | | |
|---|---|---|---|---|
| 4,469,849 A | * | 9/1984 | Murrer ............... | C08F 8/04 585/273 |
| 4,816,525 A | * | 3/1989 | Rempel ............... | C08C 19/02 525/329.3 |
| 6,683,136 B2 | | 1/2004 | Guo et al. | |
| 8,507,398 B2 | | 8/2013 | Meca et al. | |
| 10,290,872 B2 | | 5/2019 | Jeong | |
| 2002/0107138 A1 | | 8/2002 | Hoveyda et al. | |
| 2009/0076226 A1 | | 3/2009 | Meca et al. | |
| 2013/0005916 A1 | * | 1/2013 | Ong .................... | C08L 15/005 525/338 |
| 2014/0249277 A1 | * | 9/2014 | Liu .................... | B01J 31/2265 525/329.3 |
| 2016/0322639 A1 | * | 11/2016 | Jeong ................. | H01M 4/136 |
| 2018/0053932 A1 | | 2/2018 | Jeong | |

FOREIGN PATENT DOCUMENTS

| | | |
|---|---|---|
| CA | 2048929 | 2/1992 |
| CN | 104140479 A | 11/2014 |
| CN | 107308985 A | 11/2017 |
| DE | 25 39 132 A1 | 3/1977 |
| DE | 10 2015 225 719 A1 | 3/2016 |
| EP | 0 471 250 A1 | 2/1992 |
| EP | 0 588 097 A1 | 3/1994 |
| EP | 1 862 477 A1 | 5/2007 |
| EP | 2 027 920 A1 | 2/2009 |
| EP | 1 405 840 A1 | 6/2020 |
| GB | 1 558 491 A | 1/1980 |
| WO | 96/04289 A1 | 2/1996 |
| WO | 97/06185 A1 | 2/1997 |
| WO | 02/100905 A1 | 12/2002 |
| WO | 02/100941 A1 | 12/2002 |
| WO | 2004/035596 A1 | 4/2004 |
| WO | 2012/175725 A1 | 12/2012 |
| WO | 2013/056400 A1 | 4/2013 |
| WO | 2013/057285 A1 | 4/2013 |
| WO | 2013/057286 A1 | 4/2013 |
| WO | 2013/057295 A2 | 4/2013 |
| WO | 2013/160470 A1 | 10/2013 |
| WO | 2013/190371 A1 | 12/2013 |
| WO | 2013/190373 A1 | 12/2013 |
| WO | 2014/198658 A1 | 12/2014 |
| WO | 2016/166097 A1 | 10/2016 |

* cited by examiner

*Primary Examiner* — Robert C Boyle
(74) *Attorney, Agent, or Firm* — Norris McLaughlin, P.A.

(57) ABSTRACT

The present invention relates to a process for preparing solutions of hydrogenated nitrile-diene copolymer, wherein the nitrile-diene copolymer dissolved in an ether-containing or ketone-containing solvent mixture is subjected to hydrogenation conditions. The invention further relates to solutions of hydrogenated nitrile-diene copolymer (HNBR solutions) comprising CPME as solvent, and to the use of HNBR solutions in CPME-containing solvent mixtures as binder in electrodes.

9 Claims, No Drawings

PROCESS FOR PREPARING HNBR SOLUTIONS WITH ALTERNATIVE SOLVENTS

This application is a 371 of PCT/EP2019/082538, filed Nov. 26, 2019, which claims foreign priority benefit under 35 U.S.C. § 119 of European Patent Application No. 18213114.4, filed Dec. 17, 2018, the disclosures of which are incorporated herein by reference.

FIELD OF INVENTION

The present invention relates to a process for preparing solutions of hydrogenated nitrile-diene copolymer, wherein the nitrile-diene copolymer dissolved in an ether-containing or ketone-containing solvent mixture is subjected to hydrogenation conditions. The invention further relates to solutions of hydrogenated nitrile-diene copolymer (HNBR solutions) comprising CPME as solvent, and to the use of HNBR solutions in CPME-containing solvent mixtures as binder in electrodes.

BACKGROUND OF INVENTION

The prior art discloses that hydrogenated nitrile rubber (HNBR) can be produced by hydrogenating unhydrogenated nitrile rubber (NBR) in the presence of a hydrogenation catalyst in organic solvents ("solution hydrogenation") or in latex ("latex hydrogenation").

Even the earliest publications relating to HNBR production, for example DE-A-25 39 132, disclose the hydrogenation of NBR to HNBR in organic solvents such as toluene, benzene, xylene, dimethylformamide, ethyl acetate, methyl ethyl ketone (MEK), tetrahydrofuran, cyclohexanone or methylene chloride.

EP-A-0 588 097 discloses the hydrogenation of NBR to HNBR with ruthenium catalysts, for example carbonyl-chlorostyrene-bis(tricyclohexylphosphine)ruthenium(II) in methyl ethyl ketone (MEK).

EP-A-1 862 477 discloses the hydrogenation of NBR to HNBR in organic solvents such as dichloromethane, benzene, toluene, acetone, cyclohexane, methyl ethyl ketone (MEK) or monochlorobenzene (MCB).

EP-A-0 471 250 discloses the hydrogenation of NBR to HNBR in chlorinated aromatic solvents such as monochlorobenzene (MCB) or dichlorobenzene.

WO-A-2012/175725 discloses the hydrogenation of NBR to HNBR in organic solvents such as benzene, toluene, cyclohexane, dimethyl sulfoxide (DMSO), ethylene carbonate (EC), tetrahydrofuran (THF), 1,4-dioxane, monochlorobenzene (MCB), dichlorobenzene (DCB), trichlorobenzene (TCB), monobromobenzene (MBB), dibromobenzene (DBB), tribromobenzene (TBB), methyl ethyl ketone (MEK), N,N-dimethylformamide (DMF), N,N-dimethylacetamide (DMAC), or mixtures thereof.

DE-A-102015225719 and US-A-2018053932 disclose slurries comprising an HNBR as binder and cyclopentyl methyl ether (CPME) as solvent.

EP-A-1 405 840 discloses the cycloalkyl alkyl ether has excellent solubility for organic binders, for example acrylonitrile-butadiene rubber binders.

A problem with the hydrogenation of nitrile rubber is the Mooney jump, i.e. the significant rise in Mooney viscosity that occurs on hydrogenation of NBR to give HNBR. A high Mooney viscosity can have very disadvantageous effects in some applications, for example in the process of injection-moulding HNBR-based compositions. In order to counter the rise in Mooney viscosity, it is often the case that either costly metathesis reactions are conducted or shearing methods are employed.

The prior art also discloses that some metathesis catalysts can simultaneously also act as hydrogenation catalysts through injection of hydrogen. For example, J. Am. Chem. Soc. (2007) 129, 4168-4169, WO-A-2013/056400, WO-A-2013/057295, WO-A-2013/057285, WO-A-2013/057286, WO-A-2013/190371 and WO-A-2013/190373 disclose Ru-based catalysts that can be used both for metathesis reactions and for hydrogenation reactions.

Further Ru-based hydrogenation catalysts suitable for solution hydrogenation of NBR are disclosed inter alia in WO-A-2013/160470, WO-A-2014/198658 and WO-A-2016/166097.

Within the context of hydrogenating nitrile rubbers, further reference can be made to CN104140479, CN107308985 and Chunjin Ai et al., "Selectively Catalytic Hydrogenation of Nitrile-Butadiene Rubber Using Grubbs II Catalyst", Macromolecular Research, 25(5), 461-465 (2017).

For complete hydrogenation, the hydrogenation reaction is continued until the content of residual double bonds (RDB) is less than 1% of the double bonds originally present in the NBR.

A further important aspect with regard to hydrogenation is the hydrogenation efficiency (expressed by a small catalyst requirement and/or a short reaction time), since it is a constant desire to reduce the amount of catalyst and increase the production plant capacity. In hydrogenation reactions having a high hydrogenation efficiency, the same amount of catalyst achieves an RDB of <1% within a shorter time than in the case of hydrogenation reactions having low hydrogenation efficiency.

In conventional HNBR production, NBR is dissolved in monochlorobenzene (MCB). In this solution, a metathesis reaction is first conducted with a metathesis catalyst to reduce the Mooney viscosity, and then a hydrogenation with Wilkinson catalyst.

Even though some metathesis catalysts still remain active during the hydrogenation and function as a hydrogenation catalyst on contacting of hydrogen with the NBR solution, the hydrogenation efficiency is thus low. Other Ru-based catalysts do have a higher hydrogenation efficiency, but have no activity as a metathesis catalyst.

There is no known reaction system to date in which both the reduction in Mooney viscosity and improved hydrogenation efficiency and hence overall process efficiency can be achieved independently with the same catalyst.

Accordingly, it is an object of the present invention to provide an improved process for producing solutions of hydrogenated nitrile-diene copolymer that has both to a reduction in the viscosity and a high hydrogenation efficiency. It is a further object of the present invention to overcome the aforementioned problems of the prior art.

SUMMARY OF INVENTION

This object is achieved by the subject-matter of the present invention, which is therefore a process for preparing hydrogenated nitrile-diene (HNBR)copolymer, wherein
  (i) a nitrile-diene copolymer is provided,
  (ii) ether-containing or ketone-containing solvent mixtures are provided,
  (iii) the nitrile-diene copolymer according to (i) gets dissolved in the ether-containing or ketone-containing solvent mixtures according to (ii) and is subjected to hydrogenation conditions, and the hydrogenation is conducted in the presence of a metathesis catalyst selected from the group consisting of Grubbs I catalyst of the structure (IV), Grubbs II catalyst of the structure (V), Zhan 1B catalyst of the structure (XV), Grela catalyst of the structure (XVI), and Grubbs-Hoveyda II catalyst of the structure (VII):

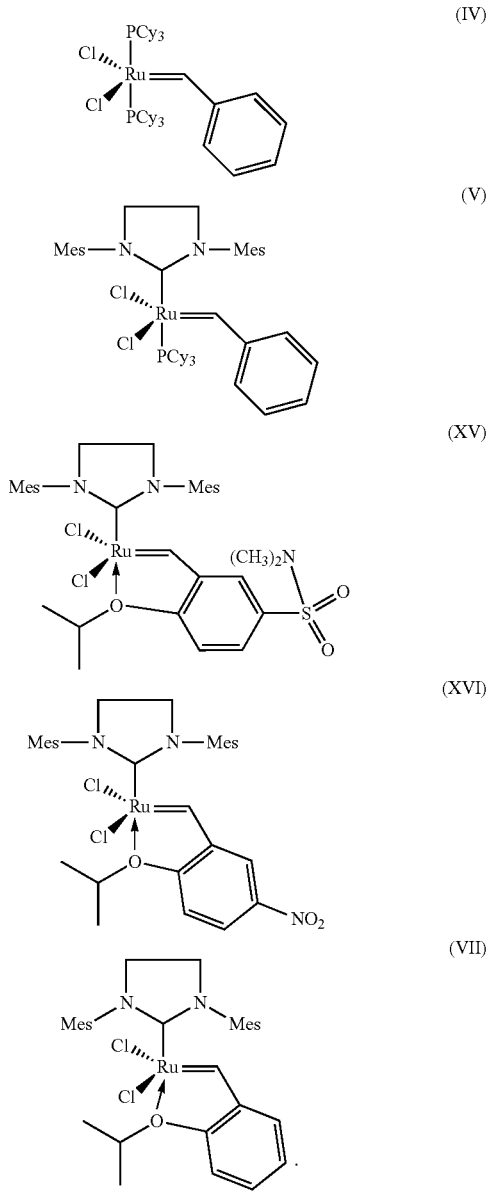

It has been found that, surprisingly, even the addition of small amounts of ether, for example cyclopentyl methyl ether (CPME), or ketone, for example methyl ethyl ketone (MEK), to MCB, or mixtures of ether and ketone, has the effect that the metathesis reaction continues, but hydrogenation also proceeds up to a residual double bond content of <1% within a short time without additional hydrogenation catalysts.

DETAILED DESCRIPTION

For a complete understanding of the present invention and the advantages thereof, reference is made to the following detailed description.

It should be appreciated that the various aspects and embodiments of the detailed description as disclosed herein are illustrative of the specific ways to make and use the invention and do not limit the scope of invention when taken into consideration with the claims and the detailed description. It will also be appreciated that features from different aspects and embodiments of the invention may be combined with features from different aspects and embodiments of the invention.

In the context of this application, "nitrile-diene copolymer" (nitrile-butadiene copolymer, nitrile rubber, also abbreviated to "NBR") is understood to mean rubbers which are co-, ter- or quaterpolymers of at least one α,β-ethylenically unsaturated nitrile, at least one conjugated diene and optionally one or more additional co-polymerizable monomers. The term thus also encompasses copolymers having two or more α,β-ethylenically unsaturated nitrile monomer units and two or more conjugated diene monomer units.

"Hydrogenated nitrile-diene copolymer" ("HNBR") is understood to mean corresponding co-, ter- or quaterpolymers in which at least some of the C=C double bonds in the copolymerized diene units have been hydrogenated.

The term "fully hydrogenated" means that the degree of hydrogenation of the butadiene units in the hydrogenated nitrile-diene copolymer is 99.1% to 100%.

The term "copolymer" encompasses polymers having more than one monomer unit.

The α,β-ethylenically unsaturated nitrile used which forms the α,β-ethylenically unsaturated nitrile units may be any known α,β-ethylenically unsaturated nitrile. Preference is given to ($C_3$-$C_5$)-α,β-ethylenically unsaturated nitriles such as acrylonitrile, α-haloacrylonitrile, for example α-chloroacrylonitrile and α-bromoacrylonitrile, α-alkylacrylonitrile, for example methacrylonitrile, ethacrylonitrile or mixtures of two or more α,β-ethylenically unsaturated nitriles. Particular preference is given to acrylonitrile, methacrylonitrile, ethacrylonitrile or mixtures thereof. Acrylonitrile is very particularly preferred.

The amount of α,β-ethylenically unsaturated nitrile units is typically in the range from 10% by weight to 60% by weight, preferably 15% by weight to 50% by weight, more preferably from 17% by weight to 44% by weight, based on the total amount of 100% by weight of all monomer units in the nitrile-diene copolymer.

The conjugated diene which forms the conjugated diene units may be any conjugated diene, especially conjugated $C_4$-$C_{12}$ dienes. Particular preference is given to 1,3-butadiene, isoprene, 2,3-dimethylbutadiene, 1,3-pentadiene (piperylene), 2-chloro-1,3-butadiene or mixtures thereof. 1,3-Butadiene and isoprene or mixtures thereof are especially preferred. 1,3-Butadiene is very particularly preferred.

The amount of conjugated diene is typically in the range from 40% by weight to 90% by weight, preferably 50% by weight to 85% by weight and more preferably 56% by weight to 83% by weight, based on the total amount of 100% by weight of all monomer units of the nitrile-diene copolymer.

Further Co-Monomers

α,β-ethylenically unsaturated carboxylic ester units

In addition to the α,β-ethylenically unsaturated nitrile units and the conjugated diene units, the nitrile-diene copolymer may contain at least one α,β-ethylenically unsaturated carboxylic ester unit as a further unit.

Typical α,β-ethylenically unsaturated carboxylic ester units are
- alkyl (meth)acrylate, especially $C_4$-$C_{18}$-alkyl (meth)acrylate, preferably n-butyl, tert-butyl, n-pentyl or n-hexyl (meth)acrylate;
- alkoxyalkyl (meth)acrylate, especially $C_4$-$C_{18}$-alkoxyalkyl (meth)acrylate, preferably $C_4$-$C_{12}$-alkoxyalkyl (meth)acrylate;
- hydroxyalkyl (meth)acrylate, especially $C_4$-$C_{18}$-hydroxyalkyl (meth)acrylate, preferably $C_4$-$C_{12}$-hydroxyalkyl (meth)acrylate;
- cycloalkyl (meth)acrylate, especially $C_5$-$C_{18}$-cycloalkyl (meth)acrylate, preferably $C_6$-$C_{12}$-cycloalkyl (meth)acrylate, more preferably cyclopentyl (meth)acrylate, cyclohexyl (meth)acrylate, cycloheptyl (meth)acrylate;
- alkylcycloalkyl (meth)acrylate, especially $C_6$-$C_{12}$-alkylcycloalkyl (meth)acrylate, preferably $C_7$-$C_{10}$-alkylcycloalkyl (meth)acrylate, more preferably methylcyclopentyl (meth)acrylate and ethylcyclohexyl (meth)acrylate;
- aryl monoesters, especially $C_6$-$C_{14}$-aryl monoesters, preferably phenyl (meth)acrylate or benzyl (meth)acrylate;
- amino-containing α,β-ethylenically unsaturated carboxylic esters, for example dimethylaminomethyl acrylate or diethylaminoethyl acrylate;
- α,β-ethylenically unsaturated monoalkyl dicarboxylates, preferably
  - alkyl, especially $C_4$-$C_{18}$-alkyl, preferably n-butyl, tert-butyl, n-pentyl or n-hexyl, more preferably mono-n-butyl maleate, mono-n-butyl fumarate, mono-n-butyl citraconate, mono-n-butyl itaconate, most preferably mono-n-butyl maleate,
  - alkoxyalkyl, especially $C_4$-$C_{18}$-alkoxyalkyl, preferably $C_4$-$C_{12}$-alkoxyalkyl,
  - hydroxyalkyl, especially $C_4$-$C_{18}$-hydroxyalkyl, preferably $C_4$-$C_{12}$-hydroxyalkyl,
  - cycloalkyl, especially $C_5$-$C_{18}$-cycloalkyl, preferably $C_6$-$C_{12}$-cycloalkyl, more preferably monocyclopentyl maleate, monocyclohexyl maleate, monocycloheptyl maleate, monocyclopentyl fumarate, monocyclohexyl fumarate, monocycloheptyl fumarate, monocyclopentyl citraconate, monocyclohexyl citraconate, monocycloheptyl citraconate, monocyclopentyl itaconate, monocyclohexyl itaconate and monocycloheptyl itaconate,
  - alkylcycloalkyl, especially $C_6$-$C_{12}$-alkylcycloalkyl, preferably $C_7$-$C_{10}$-alkylcycloalkyl, more preferably monomethylcyclopentyl maleate and monoethylcyclohexyl maleate, monomethylcyclopentyl fumarate and monoethylcyclohexyl fumarate, monomethylcyclopentyl citraconate and monoethylcyclohexyl citraconate; monomethylcyclopentyl itaconate and monoethylcyclohexyl itaconate;
  - aryl monoesters, especially $C_6$-$C_{14}$-aryl monoesters, preferably monoaryl maleates, monoaryl fumarates, monoaryl citraconates or monoaryl itaconates, more preferably monophenyl maleate or monobenzyl maleate, monophenyl fumarate or monobenzyl fumarate, monophenyl citraconate or monobenzyl citraconate, monophenyl itaconate or monobenzyl itaconate,
- unsaturated polyalkyl polycarboxylates, for example dimethyl maleate, dimethyl fumarate, dimethyl itaconate or diethyl itaconate;
- or mixtures thereof.

In a particularly preferred embodiment, the nitrile-diene copolymer contains a ($C_1$-$C_4$)-alkyl methacrylate as a further monomer unit, most preferably butyl acrylate.

The amount of the optional α,β-ethylenically unsaturated carboxylic ester units in nitrile-diene copolymers according to the invention is typically in the range from 0% by weight to 20% by weight, preferably 0.5% by weight to 15% by weight and more preferably 1% by weight to 10% by weight, based on the total amount of 100% by weight of all monomer units of the nitrile-diene copolymer.

In addition to the α,β-ethylenically unsaturated nitrile units and the conjugated diene units, the nitrile-diene copolymer may contain, as a further unit, at least one PEG acrylate unit derived from the general formula (I)

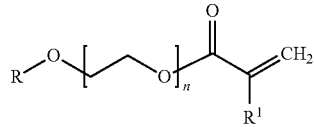

Formula (I)

where
- R is branched or unbranched $C_1$-$C_{20}$-alkyl, preferably $C_2$-$C_{20}$-alkyl, more preferably methyl, ethyl, butyl or ethylhexyl,
- n is 1 to 12, preferably 1 to 8, more preferably 1 to 5 and most preferably 1, 2 or 3 and
- $R^1$ is hydrogen or $CH_3$—.

The term "(meth)acrylate" in the context of this invention represents "acrylate" and "methacrylate". When the $R^1$ radical in the general formula (I) is $CH_3$—, the molecule is a methacrylate.

The term "polyethylene glycol" or the abbreviation "PEG" in the context of this invention represents ethylene glycol sections having 1 to 12 repeat ethylene glycol units (PEG-1 to PEG-12; n=1 to 12).

The term "PEG acrylate" is also abbreviated to PEG-X-(M)A where "X" represents the number of repeat ethylene glycol units, "MA" represents methacrylate and "A" represents acrylate.

Acrylate units derived from PEG acrylates of general formula (I) are referred to in the context of this invention as "PEG acrylate unit".

Preferred PEG acrylate units are derived from the PEG acrylates of formulae 1 to 8 which follow, wherein n=1, 2, 3, 4, 5, 6, 7, 8, 9, 10, 11 or 12, preferably 1, 2, 3, 4, 5, 6, 7 or 8, more preferably 1, 2, 3, 4 or 5 and most preferably 2 or 3:

Ethoxy polyethylene glycol acrylate (Formula no. 1)

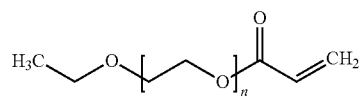

| | |
|---|---|
| Ethoxy polyethylene glycol methacrylate (Formula no. 2) | 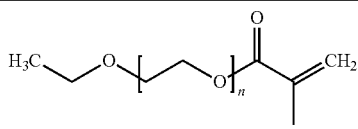 |
| Propoxy polyethylene glycol acrylate (Formula no. 3) | 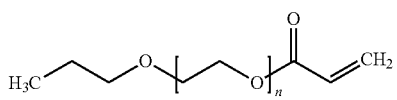 |
| Propoxy polyethylene glycol methacrylate (Formula no. 4) | 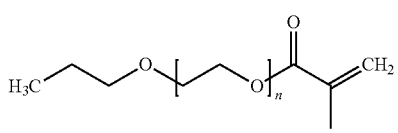 |
| Butoxy polyethylene glycol acrylate (Formula no. 5) | 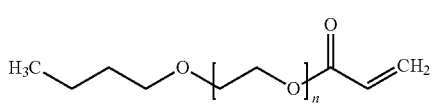 |
| Butoxy polyethylene glycol methacrylate (Formula no. 6) | 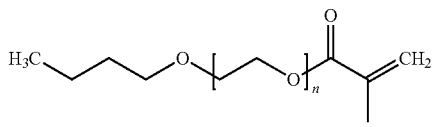 |
| Ethylhexyloxy polyethylene glycol acrylate (Formula no. 7) | 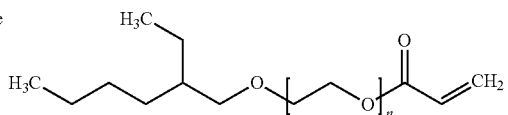 |
| Ethylhexyloxy polyethylene glycol methacrylate (Formula no. 8) | 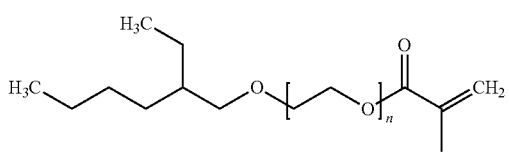 |

Other commonly used terms for ethoxy polyethylene glycol acrylate (Formula no. 1) are, for example, poly(ethylene glycol) ethyl ether acrylate, ethoxy PEG acrylate, ethoxy poly(ethylene glycol) monoacrylate or poly(ethylene glycol) monoethyl ether monoacrylate.

These PEG acrylates can be purchased commercially, for example from Arkema under the Sartomer® trade name, from Evonik under the Visiomer® trade name or from Sigma Aldrich.

The amount of the optional PEG acrylate units in the nitrile-diene copolymer is typically in the range from 0% by weight to 60% by weight, preferably from 20% by weight to 60% by weight and more preferably from 20% by weight to 55% by weight, based on the total amount of 100% by weight of all monomer units.

In an alternative embodiment, the nitrile-diene copolymer contains not only the α,β-ethylenically unsaturated nitrile unit and the conjugated diene unit as a further monomer but also a PEG acrylate unit derived from a PEG acrylate of general formula (I) and, as a further unsaturated carboxylic ester unit, a monoalkyl dicarboxylate unit, preferably monobutyl maleate.

In a preferred nitrile-diene copolymer according to the invention, the α,β-ethylenically unsaturated nitrile unit is derived from acrylonitrile or methacrylonitrile, more preferably from acrylonitrile, the conjugated diene unit is derived from isoprene or 1,3-butadiene, more preferably from 1,3-butadiene, and the optional PEG acrylate unit is derived from PEG acrylate of the general formula (I) where n is 2 to 8, more preferably from PEG acrylate of the general formula (I) with n=2 or 3, where no further carboxylic ester unit is present.

In a further preferred nitrile-diene copolymer according to the invention, the α,β-ethylenically unsaturated nitrile unit is derived from acrylonitrile or methacrylonitrile, more preferably from acrylonitrile, the conjugated diene unit is derived from isoprene or 1,3-butadiene, more preferably from 1,3-butadiene, and the optional PEG acrylate unit is derived from a PEG acrylate of the general formula (I) where n=2 to 12, more preferably from a PEG acrylate of the general formula (I) with n=2 or 3.

In addition, the nitrile-diene copolymer may contain one or more further copolymerizable monomers in an amount of 0% by weight to 20% by weight, preferably 0.1% by weight to 10% by weight, based on the total amount of 100% by weight of all monomer units. In that case, the amounts of the other monomer units are reduced in a suitable manner, such that the sum total of all monomer units is always 100% by weight. The nitrile-diene copolymer may contain, as further copolymerizable monomers, one or more aromatic vinyl monomers, preferably styrene, α-methylstyrene and vinylpyridine, fluorinated vinyl monomers, preferably fluoroethyl vinyl ether, fluoropropyl vinyl ether, o-fluoromethylstyrene, vinyl pentafluorobenzoate, difluoroethylene and tetrafluoroethylene, or else α-olefins, preferably $C_2$-$C_{12}$ olefins, for example ethylene, 1-butene, 4-butene, 4-methyl-1-pentene, 1-hexene or 1-octene, non-conjugated dienes, preferably $C_4$-$C_{12}$ dienes such as 1,4-pentadiene, 1,4-hexadiene, 4-cyanocyclohexene, 4-vinylcyclohexene, vinylnorbornene, dicyclopentadiene or else alkynes such as 1- or 2-butyne, α,β-ethylenically unsaturated monocarboxylic acids, preferably acrylic acid, methacrylic acid, crotonic acid or cinnamic acid, α,β-ethylenically unsaturated dicarboxylic acids, preferably maleic acid, fumaric acid, citraconic acid, itaconic acid, copolymerizable antioxidants, for example N-(4-anilinophenyl)acrylamide, N-(4-anilinophenyl)methacrylamide, N-(4-anilinophenyl)cinnamide, N-(4-anilinophenyl)crotonamide, N-phenyl-4-(3-vinylbenzyloxy)aniline, N-phenyl-4-(4-vinylbenzyloxy)aniline or crosslinkable monomers, for example divinyl components such as divinylbenzene for example.

In an alternative embodiment, the nitrile-diene copolymer contains, as optional PEG acrylate units, ethoxy, butoxy or ethylhexyloxy polyethylene glycol (meth)acrylate comprising 2 to 12 repeat ethylene glycol units, more preferably ethoxy or butoxy polyethylene glycol (meth)acrylate comprising 2 to 5 repeat ethylene glycol units and most preferably ethoxy or butoxy polyethylene glycol (meth)acrylate comprising 2 or 3 repeat ethylene glycol units.

In a further alternative embodiment, the nitrile-diene copolymer includes 8% to 18% by weight of acrylonitrile units, 27% to 65% by weight of 1,3-butadiene units and optionally 27% to 55% by weight of PEG-2 acrylate units or PEG-3 acrylate units.

In a preferred embodiment, the nitrile-diene copolymer, as well as nitrile monomer units and diene monomer units, as further monomer unit, includes an α,β-ethylenically unsaturated carboxylic ester unit, a PEG acrylate unit or an α,β-ethylenically unsaturated carboxylic acid unit.

The most preferred nitrile-diene copolymers contain acrylonitrile/butadiene; acrylonitrile/butadiene/(meth)acrylic acid; acrylonitrile/butadiene/butyl (meth)acrylate; acrylonitrile/butadiene/butyl maleate; acrylonitrile/butadiene/butyl itaconate; acrylonitrile/butadiene/methoxyethyl (meth)acrylate; acrylonitrile/butadiene/butoxydiglycol (meth)acrylate or acrylonitrile/butadiene/ethoxytriglycol (meth)acrylate.

The unhydrogenated nitrile-diene copolymer according to the invention typically has a number-average molecular weight (Mw) of 25 000 g/mol to 5 000 000 g/mol, preferably 100 000 g/mol to 2 500 000 g/mol, more preferably 125 000 g/mol to 1 250 000 g/mol and most preferably 150 000 g/mol to 700 000 g/mol.

The unhydrogenated nitrile-diene copolymer according to the invention typically has a polydispersity index (PDI=$M_w$/$M_n$ where $M_w$ represents the weight-average molecular weight) of 1.5 to 6, preferably 2 to 5 and more preferably 2.5 to 4.

The unhydrogenated nitrile-diene copolymer according to the invention typically has a Mooney viscosity (ML1+4@100° C.) of 10 to 150, preferably of 20 to 120 and more preferably of 25 to 100.

Process for Preparing Unhydrogenated Nitrile-Diene Copolymers

The preparation of the unhydrogenated nitrile-diene copolymers required as an intermediate for the hydrogenation can be effected by polymerization of the abovementioned monomers and has been described extensively in the literature (e.g. Houben-Weyl, Methoden der Organischen Chemie [Methods of Organic Chemistry], vol. 14/1, 30 Georg Thieme Verlag Stuttgart 1961) and is not particularly restricted. In general, the process is one in which α,β-ethylenically unsaturated nitrile units, conjugated diene units and optional further monomer units are copolymerized as desired. The polymerization process used may be any known emulsion polymerization process, suspension polymerization process, bulk polymerization process and solution polymerization process. Preference is given to the emulsion polymerization process. Emulsion polymerization is especially understood to mean a process known per se in which the reaction medium used is usually water (see, inter alia, Römpp Lexikon der Chemie [Römpp's Chemistry Lexicon], volume 2, 10th edition 1997; P. A. Lovell, M. S. El-Aasser, Emulsion Polymerization and Emulsion Polymers, John Wiley & Sons, ISBN: 0471 96746 7; H. Gerrens, Fortschr. Hochpolym. Forsch. 1, 234 (1959)). The incorporation rate of the termonomer can easily be adjusted by the person skilled in the art such that a terpolymer according to the invention is obtained. The monomers can be initially charged or reacted by incrementation in two or more steps.

The metathesis reaction of nitrile rubbers is known, for example, from WO-A-02/100941 and WO-A-02/100905 and can be used to reduce the molecular weight.

The metathesis reaction is conducted in the presence of a metathesis catalyst.

The metathesis catalysts to be used in accordance with the invention are metathesis catalysts based on molybdenum, osmium or ruthenium. Preferred metathesis catalysts are ruthenium-based metathesis catalysts.

Suitable metathesis catalysts according to the invention are compounds of the general formula (A)

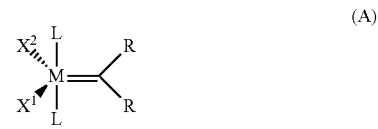

(A)

where

M is osmium or ruthenium, $X^1$ and $X^2$ are the same or different and represent two ligands, preferably anionic ligands, L represent identical or different ligands, preferably uncharged electron donors, R are the same or different and represent hydrogen, alkyl, preferably $C_1$-$C_{30}$-alkyl, cycloalkyl, preferably $C_3$-$C_{20}$-cycloalkyl, alkenyl, preferably $C_2$-$C_{20}$-alkenyl, alkynyl, preferably $C_2$-$C_{20}$-alkynyl, aryl, preferably $C_6$-$C_{24}$-aryl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulfonyl, preferably $C_1$-$C_{20}$-alkylsulfonyl, or alkylsulfinyl, preferably $C_1$-$C_{20}$-alkylsulfinyl, where all these radicals may each optionally be substituted by one or more alkyl, halogen, alkoxy, aryl or heteroaryl radicals, or alternatively the two R radicals together with the common carbon atom to which they are bonded are bridged to form a cyclic group which may be aliphatic or aromatic in nature, is optionally substituted and may contain one or more heteroatoms.

In preferred catalysts of the general formula (A), one R radical is hydrogen and the other R radical is $C_1$-$C_{20}$-alkyl, $C_3$-$C_{10}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulfonyl or $C_1$-$C_{20}$-alkylsulfinyl, where all these radicals may each be substituted by one or more alkyl, halogen, alkoxy, aryl or heteroaryl radicals.

In the catalysts of the general formula (A), $X^1$ and $X^2$ are the same or different and are two ligands, preferably anionic ligands.

$X^1$ and $X^2$ may, for example, be hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkylthiol, $C_6$-$C_{24}$-arylthiol, $C_1$-$C_{20}$-alkylsulfonyl or $C_1$-$C_{20}$-alkylsulfinyl radicals.

The aforementioned $X^1$ and $X^2$ radicals may also be substituted by one or more further radicals, for example by halogen, preferably fluorine, $C_1$-$C_{10}$-alkyl, $C_1$-$C_{10}$-alkoxy or $C_6$-$C_{24}$-aryl, where these radicals too may optionally in turn be substituted by one or more substituents selected from the group comprising halogen, preferably fluorine, $C_1$-$C_5$-alkyl, $C_1$-$C_5$-alkoxy and phenyl.

In a preferred embodiment, $X^1$ and $X^2$ are the same or different and are halogen, especially fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulfonate.

In a particularly preferred embodiment, $X^1$ and $X^2$ are identical and are halogen, especially chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulfonate).

In the general formula (A), L are identical or different ligands and are preferably uncharged electron donors.

The two L ligands may, for example, independently represent a phosphine, sulfonated phosphine, phosphate, phosphinite, phosphonite, arsine, stibine, ether, amine, amide, sulfoxide, carboxyl, nitrosyl, pyridine, thioether or imidazolidine ("Im") ligand.

Preferably, the two L ligands are independently a $C_6$-$C_{24}$-aryl-, $C_1$-$C_{10}$-alkyl- or $C_3$-$C_{20}$-cycloalkylphosphine ligand, a sulfonated $C_6$-$C_{24}$-aryl- or sulfonated $C_1$-$C_{10}$-alkylphosphine ligand, a $C_6$-$C_{24}$-aryl- or $C_1$-$C_{10}$-alkylphosphinite ligand, a $C_6$-$C_{24}$-aryl- or $C_1$-$C_{10}$-alkylphosphonite ligand, a $C_6$-$C_{24}$-aryl- or $C_1$-$C_{10}$-alkylphosphite ligand, a $C_6$-$C_{24}$-aryl- or $C_1$-$C_{10}$-alkylarsine ligand, a $C_6$-$C_{24}$-aryl- or $C_1$-$C_{10}$-alkylamine ligand, a pyridine ligand, a $C_6$-$C_{24}$-aryl- or $C_1$-$C_{10}$-alkylsulfoxide ligand, a $C_6$-$C_{24}$-aryl ether or $C_1$-$C_{10}$-alkyl ether ligand or a $C_6$-$C_{24}$-aryl- or $C_1$-$C_{10}$-alkylamide ligand, all of which may each be substituted by a phenyl group which is optionally substituted in turn by a halogen, $C_1$-$C_5$-alkyl or $C_1$-$C_5$-alkoxy radical.

The term "phosphine" includes, for example, $PPh_3$, P(p-Tol)$_3$, P(o-Tol)$_3$, $PPh(CH_3)_2$, P(CF$_3$)$_3$, P(p-FC$_6$H$_4$)$_3$, P(p-CF$_3$C$_6$H$_4$)$_3$, P(C$_6$H$_4$—SO$_3$Na)$_3$, P(CH$_2$C$_6$H$_4$—SO$_3$Na)$_3$, P(isopropyl)$_3$, P(CHCH$_3$(CH$_2$CH$_3$))$_3$, P(cyclopentyl)$_3$, P(cyclohexyl)$_3$, P(neopentyl)$_3$ and P(neophenyl)$_3$.

The term "phosphinite" includes, for example, triphenylphosphinite, tricyclohexylphosphinite, triisopropylphosphinite and methyldiphenylphosphinite.

The term "phosphite" includes, for example, triphenylphosphite, tricyclohexylphosphite, tri-tert-butylphosphite, triisopropylphosphite and methyldiphenylphosphite.

The term "stibine" includes, for example, triphenylstibine, tricyclohexylstibine and trimethylstibine.

The term "sulfonate" includes, for example, trifluoromethanesulfonate, tosylate and mesylate.

The term "sulfoxide" includes, for example, $(CH_3)_2S(=O)$ and $(C_6H_5)_2S=O$.

The term "thioether" includes, for example, $CH_3SCH_3$, $C_6H_5SCH_3$, $CH_3OCH_2CH_2SCH_3$ and tetrahydrothiophene.

The term "pyridine" shall be understood in the context of this application as an umbrella term for all nitrogen-containing ligands as specified, for example, by Grubbs in WO-A-03/011455. Examples thereof are: pyridine, picolines (α-, β-, and γ-picoline), lutidines (2,3-, 2,4-, 2,5-, 2,6-, 3,4- and 3,5-lutidine), collidine (2,4,6-trimethylpyridine), trifluoromethylpyridine, phenylpyridine, 4-(dimethylamino)pyridine, chloropyridines, bromopyridines, nitropyridines, quinoline, pyrimidine, pyrrole, imidazole and phenylimidazole.

When one or both of the L ligands is an imidazolidine radical (Im), this typically has a structure of the general formula (IIa) or (IIb)

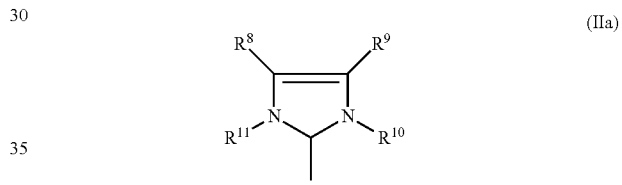

(IIa)

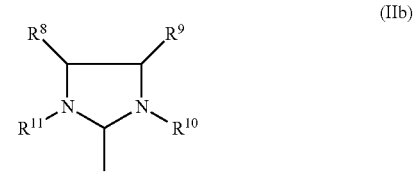

(IIb)

where $R^8$, $R^9$, $R^{10}$, $R^{11}$ are the same or different and are hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulfonyl, $C_1$-$C_{20}$-alkylsulfonate, $C_6$-$C_{20}$-arylsulfonate or $C_1$-$C_{20}$-alkylsulfinyl.

Optionally, one or more of the $R^8$, $R^9$, $R^{10}$, $R^{11}$ radicals may each independently be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, where these aforementioned substituents may in turn be substituted by one or more radicals, preferably selected from the group of halogen, especially chlorine or bromine, $C_1$-$C_5$-alkyl, $C_1$-$C_5$-alkoxy and phenyl.

Merely for clarification, it should be added that the structures of the imidazolidine radical shown in the general formulae (IIa) and (IIb) in the context of this application are equivalent to the structures (IIa') and (IIb') frequently also encountered in the literature for this imidazolidine radical (Im), which emphasize the carbene character of the imidazolidine radical. This also applies analogously to the corresponding preferred structures (IIIa)-(IIIf) shown below.

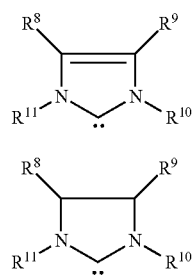
(IIa')

(IIb')

In a preferred embodiment of the catalysts of the general formula (A), $R^8$ and $R^9$ are independently hydrogen, $C_6$-$C_{24}$-aryl, more preferably phenyl, straight-chain or branched $C_1$-$C_{10}$-alkyl, more preferably propyl or butyl, or form, together with the carbon atoms to which they are bonded, a cycloalkyl or aryl radical, where all aforementioned radicals may optionally be substituted in turn by one or more further radicals selected from the group comprising straight-chain or branched $C_1$-$C_{10}$-alkyl, $C_1$-$C_{10}$-alkoxy, $C_6$-$C_{24}$-aryl and a functional group selected from the group of hydroxyl, thiol, thioether, ketone, aldehyde, ester, ether, amine, imine, amide, nitro, carboxylic acid, disulphide, carbonate, isocyanate, carbodiimide, carboalkoxy, carbamate and halogen.

In a preferred embodiment of the catalysts of the general formula (A), the $R^{10}$ and $R^{11}$ radicals are additionally the same or different and are straight-chain or branched $C_1$-$C_{10}$-alkyl, more preferably isopropyl or neopentyl, $C_3$-$C_{10}$-cycloalkyl, preferably adamantyl, $C_6$-$C_{24}$-aryl, more preferably phenyl, $C_1$-$C_{10}$-alkylsulfonate, more preferably methanesulfonate, $C_6$-$C_{10}$-arylsulfonate, more preferably p-toluenesulfonate.

Optionally, the aforementioned radicals as definitions of $R^{10}$ and $R^{11}$ are substituted by one or more further radicals selected from the group comprising straight-chain or branched $C_1$-$C_5$-alkyl, especially methyl, $C_1$-$C_5$-alkoxy, aryl and a functional group selected from the group of hydroxyl, thiol, thioether, ketone, aldehyde, ester, ether, amine, imine, amide, nitro, carboxylic acid, disulphide, carbonate, isocyanate, carbodiimide, carboalkoxy, carbamate and halogen.

More particularly, the $R^{10}$ and $R^{11}$ radicals may be the same or different and are isopropyl, neopentyl, adamantyl, mesityl or 2,6-diisopropylphenyl.

Particularly preferred imidazolidine radicals (Im) have the structures (IIIa) to (IIIf) below, where Ph in each case is a phenyl radical, Bu is a butyl radical and Mes in each case is a 2,4,6-trimethylphenyl radical, or Mes alternatively in all cases is 2,6-diisopropylphenyl.

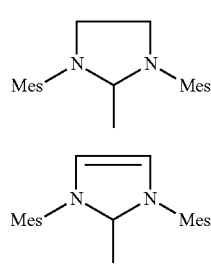
(IIIa)

(IIIb)

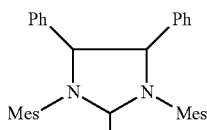
(IIIc)

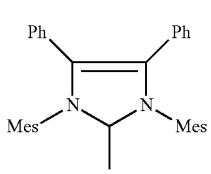
(IIId)

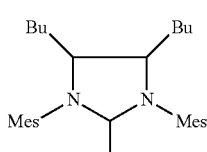
(IIIe)

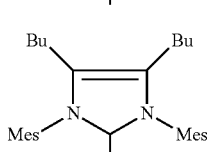
(IIIf)

A wide variety of different representatives of the catalysts of the formula (A) is known in principle, for example from WO-A-96/04289 and WO-A-97/06185.

As an alternative to the preferred Im radicals, one or both L ligands in the general formula (A) are preferably also identical or different trialkylphosphine ligands where at least one of the alkyl groups represents a secondary alkyl group or a cycloalkyl group, preferably isopropyl, isobutyl, sec-butyl, neopentyl, cyclopentyl or cyclohexyl.

More preferably, in the general formula (A), one or both L ligands are a trialkylphosphine ligand where at least one of the alkyl groups represents a secondary alkyl group or a cycloalkyl group, preferably isopropyl, isobutyl, sec-butyl, neopentyl, cyclopentyl or cyclohexyl.

Particular preference is given to catalysts which are covered by the general formula (A) and contain the structures (IV) (Grubbs I catalyst) and the structure (V) (Grubbs II catalyst), where Cy is cyclohexyl.

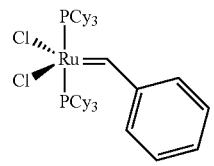
(IV)

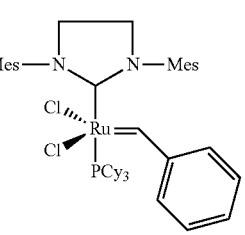
(V)

Other suitable metathesis catalysts according to the invention are also compounds of the general formula (B)

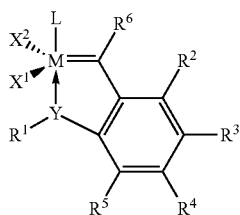

(B)

where

M is ruthenium or osmium, $X^1$ and $X^2$ are identical or different ligands, preferably anionic ligands, Y is oxygen (O), sulphur (S), an N—$R^1$ radical or a P—$R^1$ radical, where $R^1$ has the definitions given hereinafter, $R^1$ represents an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulfonyl or alkylsulfinyl radical, all of which may each optionally be substituted by one or more alkyl, halogen, alkoxy, aryl or heteroaryl radicals, $R^2$, $R^3$, $R^4$ and $R^5$ are the same or different and represent hydrogen or organic or inorganic radicals, $R^6$ is hydrogen or an alkyl, alkenyl, alkynyl or aryl radical and L is a ligand as defined for the formula (A).

The catalysts of the general formula (B) are known in principle. Representatives of this compound class are the catalysts described by Hoveyda et al. in US-A-2002/0107138 and Angew. Chem. Int. Ed. 2003, 42, 4592, and the catalysts which are described by Grela in WO-A-2004/035596, Eur. J. Org. Chem 2003, 963-966 and Angew. Chem. Int. Ed. 2002, 41, 4038, and also in J. Org. Chem. 2004, 69, 6894-96 and Chem. Eur. J 2004, 10, 777-784. The catalysts are commercially available or preparable according to the references cited.

In the catalysts of the general formula (B), L is a ligand which typically has electron donor function and may assume the same general, preferred and particularly preferred definitions as L in the general formula (A).

In addition, L in the general formula (B) preferably represents a $P(R^7)_3$ radical where $R^7$ are independently $C_1$-$C_6$ alkyl, $C_3$-$C_8$-cycloalkyl or aryl, or else an optionally substituted imidazolidine radical ("Im").

$C_1$-$C_6$-Alkyl is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl and n-hexyl.

$C_3$-$C_8$-Cycloalkyl comprises cyclopropyl, cyclobutyl, cyclopentyl, cyclohexyl, cycloheptyl and cyclooctyl.

Aryl comprises an aromatic radical having 6 to 24 skeleton carbon atoms. Preferred mono-, bi- or tricyclic carbocyclic aromatic radicals having 6 to 10 skeleton carbon atoms include, for example, phenyl, biphenyl, naphthyl, phenanthrenyl or anthracenyl.

The imidazolidine radical (Im) typically has a structure of the general formula (IIa) or (IIb)

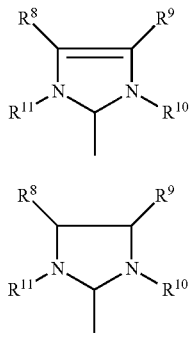

(IIa)

(IIb)

where $R^8$, $R^9$, $R^{10}$, $R^{11}$ are the same or different and are hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulfonyl, $C_1$-$C_{20}$-alkylsulfonate, $C_6$-$C_{20}$-arylsulfonate or $C_1$-$C_{20}$-alkylsulfinyl.

Optionally, one or more of the $R^8$, $R^9$, $R^{10}$, $R^{11}$ radicals may independently be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, where these aforementioned substituents may in turn be substituted by one or more radicals, preferably selected from the group of halogen, especially chlorine or bromine, $C_1$-$C_5$-alkyl, $C_1$-$C_5$-alkoxy and phenyl.

Optionally, the aforementioned radicals as definitions of $R^{10}$ and $R^{11}$ are substituted by one or more further radicals selected from the group comprising straight-chain or branched $C_1$-$C_5$-alkyl, especially methyl, $C_1$-$C_5$-alkoxy, aryl and a functional group selected from the group of hydroxyl, thiol, thioether, ketone, aldehyde, ester, ether, amine, imine, amide, nitro, carboxylic acid, disulphide, carbonate, isocyanate, carbodiimide, carboalkoxy, carbamate and halogen.

More particularly, the $R^{10}$ and $R^{11}$ radicals may be the same or different and are isopropyl, neopentyl, adamantyl or mesityl.

Particularly preferred imidazolidine radicals (Im) have the structures (IIIa-IIIf) already specified above, where Mes in each case is 2,4,6-trimethylphenyl.

In the catalysts of the general formula (B), $X^1$ and $X^2$ are the same or different and may, for example, be hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkylthiol, $C_6$-$C_{24}$-arylthiol, $C_1$-$C_{20}$-alkylsulfonyl or $C_1$-$C_{20}$-alkylsulfinyl.

The aforementioned $X^1$ and $X^2$ radicals may also be substituted by one or more further radicals, for example by halogen, preferably fluorine, $C_1$-$C_{10}$-alkyl, $C_1$-$C_{10}$-alkoxy or $C_6$-$C_{24}$-aryl radicals, where the latter radicals too may optionally in turn be substituted by one or more substituents selected from the group comprising halogen, preferably fluorine, $C_1$-$C_5$-alkyl, $C_1$-$C_5$-alkoxy and phenyl.

In a preferred embodiment, $X^1$ and $X^2$ are the same or different and are halogen, especially fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulfonate.

In a particularly preferred embodiment, $X^1$ and $X^2$ are identical and are halogen, especially chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulfonate).

In the general formula (B), the $R^1$ radical is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulfonyl or alkylsulfinyl radical, all of which may each optionally be substituted by one or more alkyl, halogen, alkoxy, aryl or heteroaryl radicals.

Typically, the $R^1$ radical is a $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulfonyl or $C_1$-$C_{20}$-alkylsulfinyl radical, all of which may each optionally be substituted by one or more alkyl, halogen, alkoxy, aryl or heteroaryl radicals.

Preferably, $R^1$ is a $C_3$-$C_{20}$-cycloalkyl radical, a $C_6$-$C_{24}$-aryl radical or a straight-chain or branched $C_1$-$C_{30}$-alkyl radical, where the latter may optionally be interrupted by one or more double or triple bonds or else one or more heteroatoms, preferably oxygen or nitrogen. More preferably, $R^1$ is a straight-chain or branched $C_1$-$C_{12}$-alkyl radical.

The $C_3$-$C_{20}$-cycloalkyl radical comprises, for example, cyclopropyl, cyclobutyl, cyclopentyl, cyclohexyl, cycloheptyl and cyclooctyl.

The $C_1$-$C_{12}$-alkyl radical may, for example, be methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, n-heptyl, n-octyl, n-decyl or n-dodecyl. More particularly, $R^1$ is methyl or isopropyl.

The $C_6$-$C_{24}$-aryl radical is an aromatic radical having 6 to 24 skeleton carbon atoms. Preferred mono-, bi- or tricyclic carbocyclic aromatic radicals having 6 to 10 skeleton carbon atoms include, for example, phenyl, biphenyl, naphthyl, phenanthrenyl or anthracenyl.

In the general formula (B), the $R^2$, $R^3$, $R^4$ and $R^5$ radicals are the same or different and may represent hydrogen or organic or inorganic radicals.

In a suitable embodiment, $R^2$, $R^3$, $R^4$, $R^5$ are the same or different and are hydrogen, halogen, nitro, $CF_3$, alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulfonyl or alkylsulfinyl radicals represent, all of which may each optionally be substituted by one or more alkyl, alkoxy, halogen, aryl or heteroaryl radicals.

Typically, $R^2$, $R^3$, $R^4$, $R^5$ are the same or different and are hydrogen, halogen, preferably chlorine or bromine, nitro, $CF_3$, $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulfonyl or $C_1$-$C_{20}$-alkylsulfinyl radicals, all of which may each optionally be substituted by one or more $C_1$-$C_{30}$-alkyl, $C_1$-$C_{20}$-alkoxy, halogen, $C_6$-$C_{24}$-aryl or heteroaryl radicals.

In a particularly proven embodiment, $R^2$, $R^3$, $R^4$, $R^5$ are the same or different and are nitro, straight-chain or branched $C_1$-$C_{30}$-alkyl, $C_5$-$C_{20}$-cycloalkyl, straight-chain or branched $C_1$-$C_{20}$-alkoxy radicals or $C_6$-$C_{24}$-aryl radicals, preferably phenyl or naphthyl. The $C_1$-$C_{30}$-alkyl radicals and $C_1$-$C_{20}$-alkoxy radicals may optionally be interrupted by one or more double or triple bonds or else one or more heteroatoms, preferably oxygen or nitrogen.

In addition, two or more of the $R^2$, $R^3$, $R^4$ or $R^5$ radicals may also be bridged via aliphatic or aromatic structures. $R^3$ and $R^4$ may, for example, including the carbon atoms to which they are bonded in the phenyl ring of the formula (B), form a fused-on phenyl ring so as to result overall in a naphthyl structure.

In the general formula (B), the $R^6$ radical is hydrogen or an alkyl, alkenyl, alkynyl or aryl radical. Preferably, $R^6$ is hydrogen or a $C_1$-$C_{30}$-alkyl, a $C_2$-$C_{20}$-alkenyl, a $C_2$-$C_{20}$-alkynyl or a $C_6$-$C_{24}$-aryl radical. More preferably, $R^6$ is hydrogen.

Additionally suitable are metathesis catalysts of the general formula (B1)

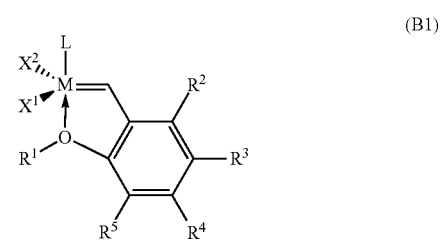

(B1)

where

M, L, $X^1$, $X^2$, $R^1$, $R^2$, $R^3$, $R^4$ and $R^5$ may have the general, preferred and particularly preferred definitions given for the general formula (B).

The catalysts of the general formula (B1) are known in principle, for example, from US-A-2002/0107138 (Hoveyda et al.) and can be obtained by preparation processes specified therein.

Particular preference is given to catalysts of the general formula (B1) where

M represents ruthenium, $X^1$ and $X^2$ are both halogen, especially both chlorine, $R^1$ is a straight-chain or branched $C_1$-$C_{12}$ alkyl radical, $R^2$, $R^3$, $R^4$, $R^5$ have the general and preferred definitions given for the general formula (B) and L has the general and preferred definitions given for the general formula (B).

Especially preferred catalysts are those of the general formula (B1) where

M represents ruthenium, $X^1$ and $X^2$ are both chlorine, $R^1$ is an isopropyl radical, $R^2$, $R^3$, $R^4$, $R^5$ are all hydrogen and L represents an optionally substituted imidazolidine radical of the formula (IIa) or (IIb)

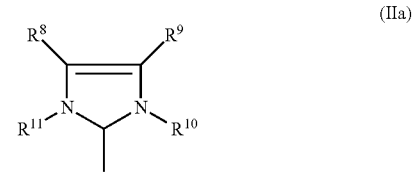

(IIa)

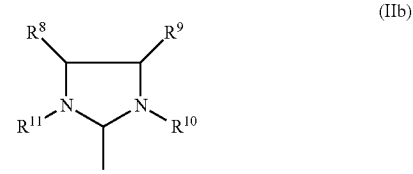

(IIb)

where $R^8, R^9, R^{10}, R^{11}$ are the same or different and are hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulfonyl, $C_1$-$C_{20}$-alkylsulfonate, $C_6$-$C_{24}$-arylsulfonate or $C_1$-$C_{20}$-alkylsulfinyl, where the aforementioned radicals may each be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, where these aforementioned substituents may in turn also be substituted by one or more radicals, preferably selected from the group of halogen, especially chlorine or bromine, $C_1$-$C_5$-alkyl, $C_1$-$C_5$-alkoxy and phenyl.

Very particular preference is given to a metathesis catalyst which is covered by the general formula (B1) and has the structure (VII), where Mes in each case is 2,4,6-trimethylphenyl.

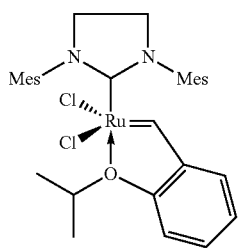

(VII)

This catalyst of the structure (VII) is also referred to in the literature as "Grubbs-Hoveyda II catalyst".

Further suitable metathesis catalysts are those which are covered by the general structural formula (B1) and have one of the following formulae (VIII), (IX), (X), (XI), (XII), (XIII), (XIV) and (XV), where Mes in each case is 2,4,6-trimethylphenyl.

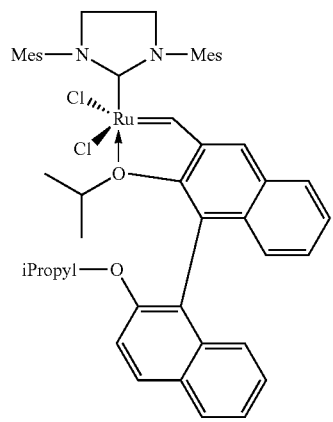

(VIII)

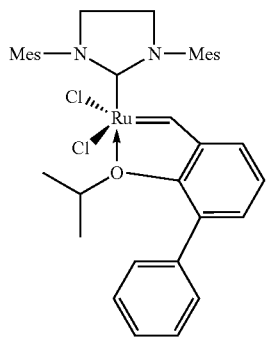

(IX)

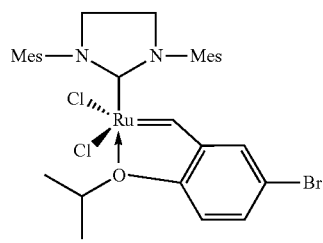

(X)

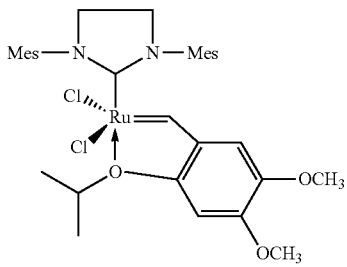

(XI)

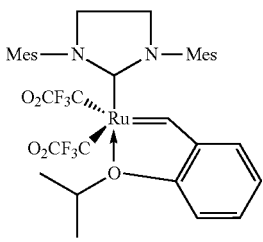

(XII)

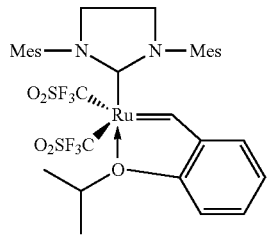

(XIII)

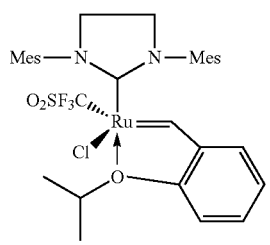

(XIV)

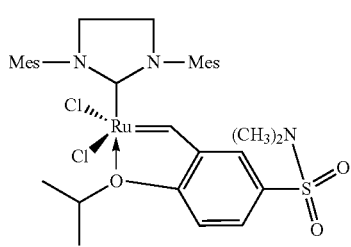

(XV)

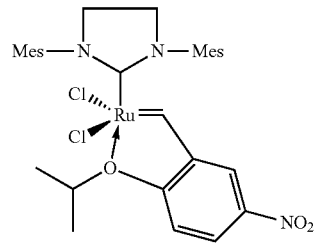

(XVI)

The catalyst of the structure (XV) is also referred to in the literature as "Zhan 1B catalyst".

A further metathesis catalyst according to the invention has a structure of the general formula (B2)

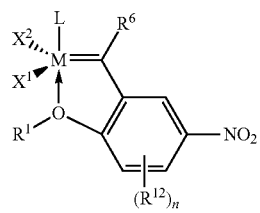

(B2)

where

M, L, $X^1$, $X^2$, $R^1$ and $R^6$ have the general and preferred definitions given for the formula (B), $R^{12}$ are the same or different and have the general and preferred definitions given for the $R^2$, $R^3$, $R^4$ and $R^5$ radicals in the formula (B), excluding hydrogen, and n is 0, 1, 2 or 3.

The catalysts of the general formula (B2) are known in principle, for example, from WO-A-2004/035596 (Grela) and can be obtained by preparation processes specified therein.

Particular preference is given to metathesis catalysts of the general formula (B2) where M represents ruthenium, $X^1$ and $X^2$ are both halogen, especially both chlorine, $R^1$ is a straight-chain or branched $C_1$-$C_{12}$ alkyl radical, $R^{12}$ is as defined for the general formula (B2), n is 0, 1, 2 or 3, $R^6$ is hydrogen and L is as defined for the general formula (B).

Especially preferred are of the general formula (B2) where

M represents ruthenium, $X^1$ and $X^2$ are both chlorine, $R^1$ is an isopropyl radical, n is 0 and L represents an optionally substituted imidazolidine radical of the formula (IIa) or (IIb) where $R^8$, $R^9$, $R^{10}$, $R^{11}$ are the same or different and are as defined for the especially preferred catalysts of the general formula (B1).

The catalyst of the structure (XVI) is also referred to in the literature as "Grela catalyst".

A further suitable metathesis catalyst has the following structure (XVII), where Mes in each case is 2,4,6-trimethylphenyl.

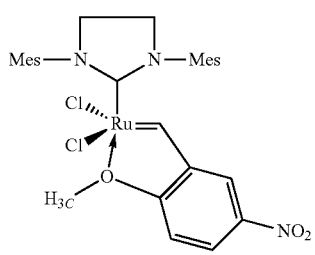

(XVII)

All the aforementioned catalysts of the (B) type can either be used as such in the reaction mixture for the NBR metathesis reaction or else they can be applied to and immobilized on a solid support. Suitable solid phases or supports are those materials which are firstly inert with respect to the metathesis reaction mixture and secondly do not impair the activity of the catalyst. The catalyst can be immobilized using, for example, metals, glass, polymers, ceramic, organic polymer beads or else inorganic sol-gels, carbon black, silica, silicates, calcium carbonate and barium sulfate.

A further alternative embodiment relates to a metathesis catalyst (N) having the general structural element (N1), where the carbon atom identified by "*" is bonded to the catalyst base skeleton via one or more double bonds,

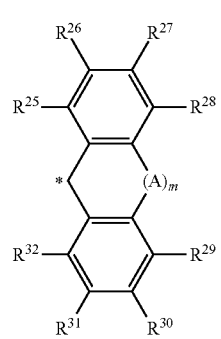

(N1)

and where $R^{25}$-$R^{32}$ are the same or different and for hydrogen, halogen, hydroxyl, aldehyde, keto, thiol, $CF_3$, nitro, nitroso, cyano, thiocyano, isocyanato, carbodiimide, carbamate, thiocarbamate, dithiocarbamate, amino, amido, imino, silyl, sulfonate (—$SO_3$—), —$OSO_3$—, —PO₃— or OPO₃— mean, or are alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulfonyl, alkylsulfinyl, dialkylamino, alkylsilyl or alkoxysilyl, where all these radicals may each optionally be substituted by one or more alkyl, halogen, alkoxy, aryl or heteroaryl radicals, or alternatively two directly adjacent radicals in each case from the group of $R^{21}$-$R^{32}$, including the ring carbon atoms to which they are bonded, are bridged to form a cyclic group, preferably an aromatic system, or alternatively $R^8$ is optionally bridged with another ligand of the ruthenium- or osmium-carbene metathesis catalyst, m is 0 or 1 and A is oxygen, sulphur, $C(R^{33}R^{34})$, N—$R^{35}$, —$C(R^{36})$=C$(R^{37})$—, —$C(R^{36})(R^{38})$—$C(R^{37})(R^{39})$—, where $R^{33}$-$R^{39}$ are the same or different and may each have the same definitions as the $R^{25}$-$R^{32}$ radicals.

The catalysts according to the invention have the structural element of the general formula (N1), where the carbon atom identified by "*" is bonded to the catalyst base skeleton via one or more double bonds. When the carbon atom identified by "*" is bonded to the catalyst base skeleton via two or more double bonds, these double bonds may be cumulated or conjugated.

Such catalysts (N) are already described in EP-A-2 027 920 and are known to the person skilled in the art.

The catalysts (N) with a structural element of the general formula (N1) include, for example, those of the following general formulae (N2a) and (N2b):

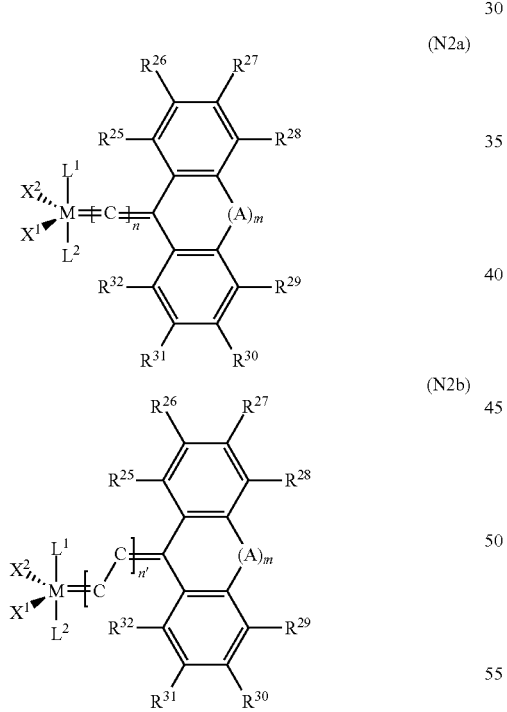

where
M is ruthenium or osmium,
$X^1$ and $X^2$ are the same or different and represent two ligands, preferably anionic ligands,
$L^1$ and $L^2$ represent identical or different ligands, preferably uncharged electron donors, where $L^2$ may alternatively also be bridged to the $R^8$ radical,
n is 0, 1, 2 or 3, preferably 0, 1 or 2,
n' is 1 or 2, preferably 1, and
$R^{25}$-$R^{32}$, m and A have the same definitions as in the general formula (N1).

In the catalysts of the general formula (N2a), the structural element of the general formula (N1) is bonded to the central metal of the metathesis catalyst via a double bond (n=0) or via 2, 3 or 4 cumulated double bonds (in the case that n=1, 2 or 3). In the inventive catalysts of the general formula (N2b), the structural element of the general formula (N1) is bonded to the metal of the metathesis catalyst via conjugated double bonds. In both cases, there is a double bond in the direction of the central metal of the metathesis catalyst on the carbon atom identified by "*".

The catalysts of the general formula (N2a) and (N2b) thus include catalysts in which the following general structural elements (N3)-(N9)

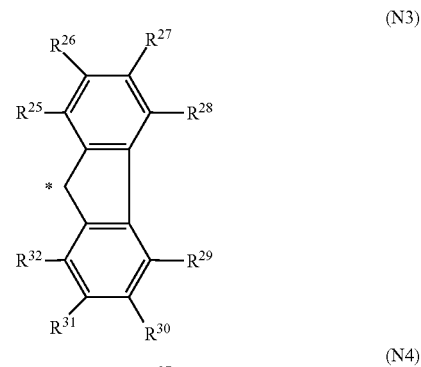

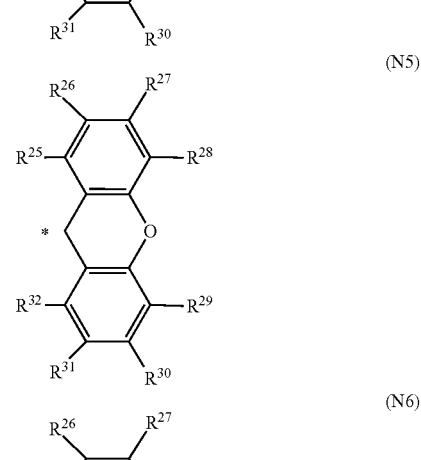

-continued

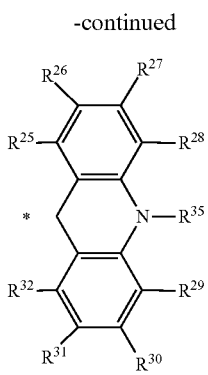
(N7)

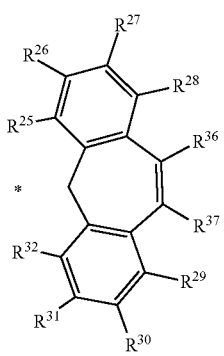
(N8)

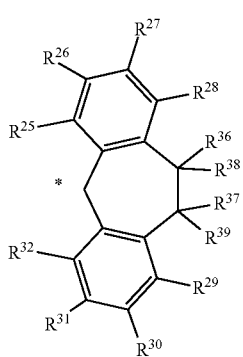
(N9)

are bonded via the carbon atom identified by "*", via one or more double bonds, to the catalyst base skeleton of the general formula (N10a) or (N10b)

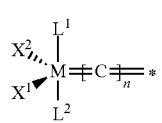
(N10a)

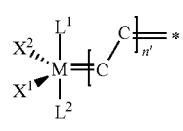
(N10b)

where $X^1$ and $X^2$, L1 and L2, n, n' and $R^{25}$-$R^{39}$ are as defined for the general formulae (N2a) and (N2b).

Typically, the inventive ruthenium- or osmium-carbene catalysts are pentacoordinated.

In the structural element of the general formula (N1), $R^{15}$-$R^{32}$ are the same or different and represent hydrogen, halogen, hydroxyl, aldehyde, keto, thiol, $CF_3$, nitro, nitroso, cyano, thiocyano, isocyanato, carbodiimide, carbamate, thiocarbamate, dithiocarbamate, amino, amido, imino, silyl, sulfonate (—$SO_3$—), —$OSO_3$—, —$PO_3$— or $OPO_3$— or are alkyl, preferably $C_1$-$C_{20}$-alkyl, especially $C_1$-$C_6$-alkyl, cycloalkyl, preferably $C_3$-$C_{20}$-cycloalkyl, especially $C_3$-$C_8$-cycloalkyl, alkenyl, preferably $C_2$-$C_{20}$-alkenyl, alkynyl, preferably $C_2$-$C_{20}$-alkynyl, aryl, preferably $C_6$-$C_{24}$-aryl, especially phenyl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulfonyl, preferably $C_1$-$C_{20}$-alkylsulfonyl, alkylsulfinyl, preferably $C_1$-$C_{20}$-alkylsulfinyl, dialkylamino, preferably di($C_1$-$C_{20}$-alkyl)amino, alkylsilyl, preferably $C_1$-$C_{20}$-alkylsilyl, or alkoxysilyl, preferably $C_1$-$C_{20}$-alkoxysilyl, radicals, where all these radicals may each be substituted by one or more alkyl, halogen, alkoxy, aryl or heteroaryl radicals, or alternatively two directly adjacent radicals in each case from the group of $R^{21}$-$R^{32}$, including the ring carbon atoms to which they are bonded, may be bridged to form a cyclic group, preferably an aromatic system, or alternatively $R^8$ is optionally bridged with another ligand of the ruthenium- or osmium-carbene metathesis catalyst, m is 0 or 1 and A is oxygen, sulphur, $C(R^{33})(R^{34})$, N—$R^{35}$, —$C(R^{36})$=$C(R^{37})$— or —$C(R^{36})(R^{38})$—$C(R^{37})(R^{39})$—, where $R^{33}$-$R^{39}$ are the same or different and may each have the same preferred definitions as the $R^1$-$R^8$ radicals.

$C_1$-$C_6$-Alkyl in the structural element of the general formula (N1) is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl and n-hexyl.

$C_3$-$C_8$-Cycloalkyl in the structural element of the general formula (N1) is, for example, cyclopropyl, cyclobutyl, cyclopentyl, cyclohexyl, cycloheptyl and cyclooctyl.

$C_6$-$C_{24}$-Aryl in the structural element of the general formula (N1) comprises an aromatic radical having 6 to 24 skeleton carbon atoms. Preferred mono-, bi- or tricyclic carbocyclic aromatic radicals having 6 to 10 skeleton carbon atoms include, for example, phenyl, biphenyl, naphthyl, phenanthrenyl or anthracenyl.

The $X^1$ and $X^2$ radicals in the structural element of the general formula (N1) have the same general, preferred and particularly preferred definitions that are given for catalysts of the general formula A.

In the general formulae (N2a) and (N2b) and analogously in the general formulae (N10a) and (N10b), the L1 and L2 radicals are identical or different ligands, preferably uncharged electron donors and may have the same general, preferred and particularly preferred definitions that are given for catalysts of the general formula A.

Preference is given to catalysts of the general formula (N2a) or (N2b) with a general structural unit (N1) where M represents ruthenium, $X^1$ and $X^2$ are simultaneously halogen, n is 0, 1 or 2 in the general formula (N2a) or n' is 1 in the general formula (N2b)

$L^1$ and $L^2$ are the same or different and have the general or preferred definitions given for the general formulae (N2a) and (N2b), $R^{25}$-$R^{32}$ are the same or different and have the general or preferred definitions given for the general formulae (N2a) and (N2b), m is either 0 or 1, and, when m=1, A is oxygen, sulphur, $C(C_1$-$C_{10}$-alkyl$)_2$, —C($C_1$-$C_{10}$-alkyl$)_2$-C($C_1$-$C_{10}$-alkyl$)_2$-, —C($C_1$-$C_{10}$-alkyl)=C($C_1$-$C_{10}$-alkyl)- or —N($C_1$-$C_{10}$-alkyl).

Very particular preference is given to catalysts of the formula (N2a) or (N2b) with a general structural unit (N1) where M represents ruthenium, $X^1$ and $X^2$ are both chlorine, n is 0, 1 or 2 in the general formula (N2a) or n' is 1 in the general formula (N2b)

$L^1$ represents an imidazolidine radical of the formulae (IIIa) to (IIIf), $L^2$ represents a sulfonated phosphine, phosphate, phosphinite, phosphonite, arsine, stibine, ether, amine, amide, sulfoxide, carboxyl, nitrosyl, pyridine radical, an imidazolidine radical of the formulae (XIIa) to (XIIf) or a phosphine ligand, especially $PPh_3$, $P(p$-$Tol)_3$, $P(o$-$Tol)_3$, $PPh(CH_3)_2$, $P(CF_3)_3$, $P(p$-$FC_6H_4)_3$, $P(p$-$CF_3C_6H_4)_3$, $P(C_6H_4$—$SO_3Na)_3$, $P(CH_2C_6H_4$—$SO_3Na)_3$, $P(isopropyl)_3$, $P(CHCH_3(CH_2CH_3))_3$, $P(cyclopentyl)_3$, $P(cyclohexyl)_3$, $P(neopentyl)_3$ and $P(neophenyl)_3$, $R^{25}$-$R^{32}$ have the general or preferred definitions given for the general formulae (N2a) and (N2b), m is either 0 or 1, and, when m=1, A is oxygen, sulphur, $C(C_1$-$C_{10}$-alkyl$)_2$, —C($C_1$-$C_{10}$-alkyl$)_2$-C($C_1$-$C_{10}$-alkyl$)_2$-, —C($C_1$-$C_{10}$-alkyl)=C($C_1$-$C_{10}$-alkyl)- or —N($C_1$-$C_{10}$-alkyl).

In the case that the $R^{25}$ radical is bridged with another ligand of the catalyst of the formula N, for example for the catalysts of the general formulae (N2a) and (N2b), this gives rise to the following structures of the general formulae (N13a) and (N13b)

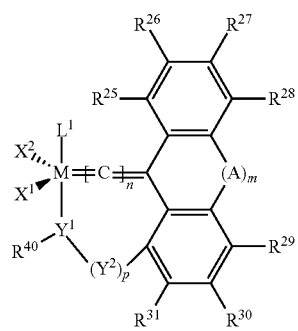

(N13a)

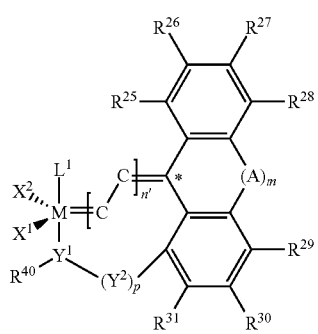

(N13b)

where $Y^1$ is oxygen, sulphur, an N—$R^{41}$ radical or a P—$R^{41}$ radical, where $R^{41}$ is as defined below, $R^{40}$ and $R^{41}$ are the same or different and represent an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulfonyl or alkylsulfinyl radical, all of which may each optionally be substituted by one or more alkyl, halogen, alkoxy, aryl or heteroaryl radicals, p is 0 or 1 and $Y^2$ when p=1 is —$(CH_2)r$- where r=1, 2 or 3, —C(=O)—$CH_2$—, —C(=O)—, —N=CH—, —N(H)—C(=O)—, or else alternatively the overall structural unit "—$Y^1(R^{40})$—$(Y^2)p$-" is (—N($R^{40}$)=CH—$CH_2$—), (—N($R^{40}$,$R^{41}$)=CH—$CH_2$—), and where M, $X^1$, $X^2$, $L^1$, $R^{25}$-$R^{32}$, A, m and n have the same definitions as in the general formulae (IIa) and (IIb).

Examples of catalysts of the formula (N) include the following structures:

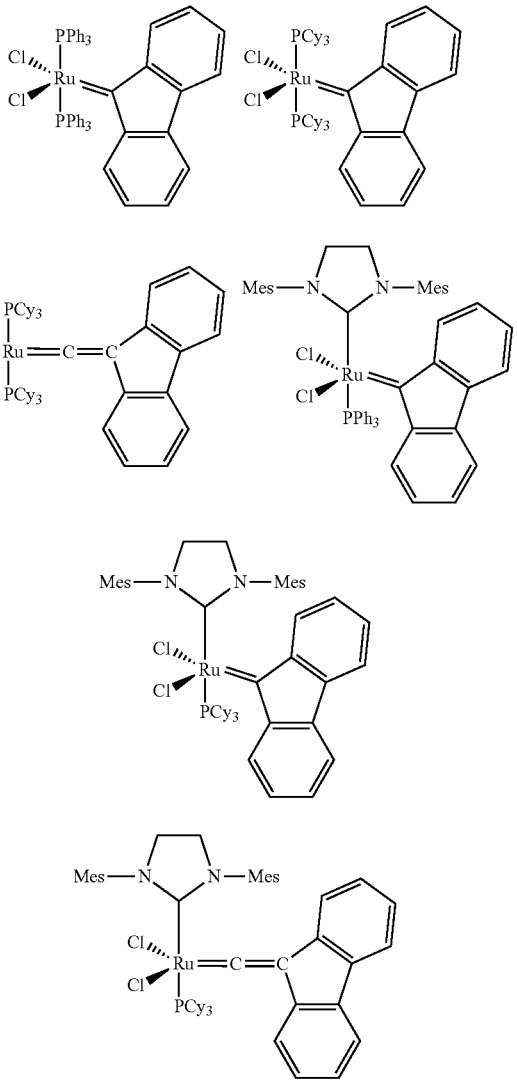

-continued

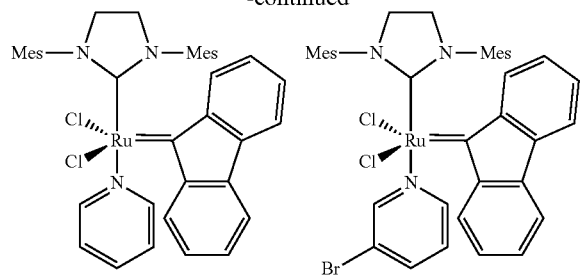
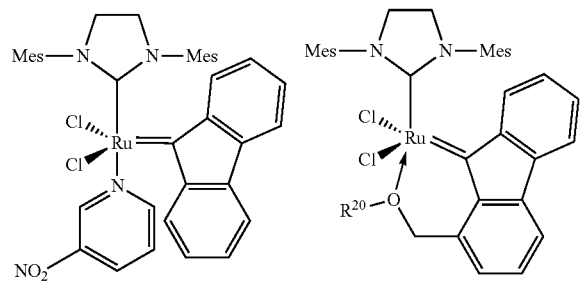
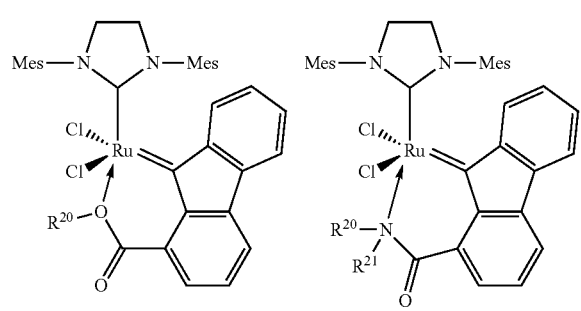
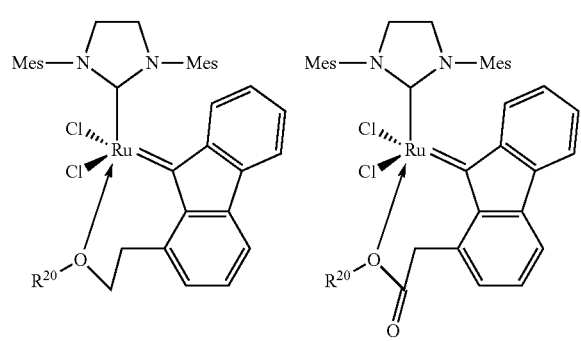
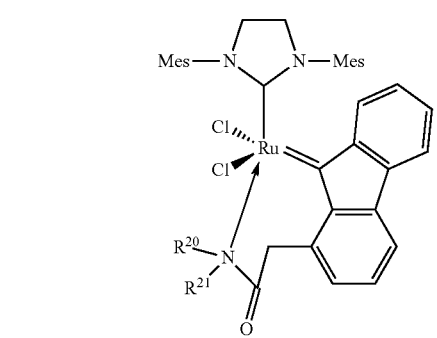

-continued

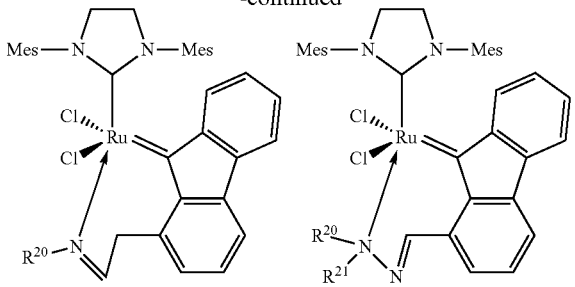
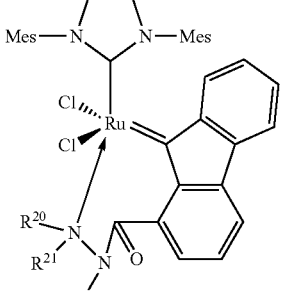

Catalysts (N) can be prepared by reacting suitable catalyst precursor complexes with suitable diazo compounds when this synthesis is conducted within a specific temperature range and, at the same time, the molar ratio of the reactants to one another is within a chosen range. For this purpose, for example, a catalyst precursor compound is with a compound of the general formula (N1-Azo)

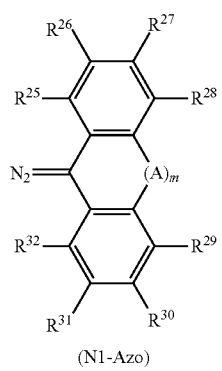

(N1-Azo)

where $R^{25}$-$R^{32}$, m and A have the definitions given for the general formula (N1), where this reaction is conducted
(i) at a temperature in the range from −20° C. to 100° C., preferably in the range from +10° C. to +80° C., more preferably in the range from +30 to +50° C. and
(ii) at a molar ratio of the catalyst precursor compound to the compound of the general formula (N1-Azo) of 1:0.5 to 1:5, preferably 1:1.5 to 1:2.5, more preferably 1:2.

The compounds of the general formula (N1-Azo) are 9-diazofluorene or a wide variety of different derivatives thereof according to the meaning of the $R^{25}$-$R^{32}$ and A radicals. It is possible to use a wide variety of different derivatives of 9-diazofluorene. In this way, a wide variety of different fluorenylidene derivatives are obtainable.

The catalyst precursor compounds are ruthenium or osmium metathesis catalysts that do not yet contain any ligands having the general structural element (N1).

In this reaction, a ligand leaves the catalyst precursor compound and a carbene ligand containing the general structural element (N1) is accepted.

Suitable for the performance of the reaction are saturated, unsaturated and aromatic hydrocarbons, ethers and halogenated solvents. Preference is given to chlorinated solvents such as dichloromethane, 1,2-dichloroethane or monochlorobenzene. Typically, the catalyst precursor compound in the form of the ruthenium or osmium precursor is initially charged in a preferably dried solvent. The concentration of the ruthenium or osmium precursor in the solvent is typically in the range from 15% to 25% by weight, preferably in the range from 15% to 20% by weight. Subsequently, the solution can be heated. Heating to a temperature in the range from 30 to 50° C. has been found to be particularly useful. Thereafter, the compound of the general formula (N1-Azo) that has been dissolved in typically dried, preferably anhydrous, solvent is added. The concentration of the compound of the general formula (N1-Azo) in the solvent is preferably in the range from 5% to 15% by weight, preferably about 10% by weight. To complete the reaction, the reaction is allowed to continue for another 0.5 h to 1.5 h; the temperature here is more preferably within the same range as stated above, i.e. 30 to 50° C. Subsequently, the solvent is removed and the residue is purified by extraction, for example with a mixture of hexane with an aromatic solvent.

Typically, the catalyst according to the invention is not obtained in pure form, but in an equimolar mixture resulting from the stoichiometry of the reaction with the reaction product of the compound of the general formula (N1-Azo) with the leaving ligand from the catalyst precursor compound used in the reaction. The leaving ligand is preferably a phosphine ligand. This reaction product can be removed in order to obtain the pure catalyst according to the invention. For catalysis of metathesis reactions, however, it is possible to use not just the pure catalyst according to the invention but also the mixture of this catalyst according to the invention with the aforementioned reaction product.

The process described above is illustrated as follows:

In the case of the catalysts of the general formula (N2a) and (N2b), a catalyst precursor compound of the general formula ("N2-precursor")

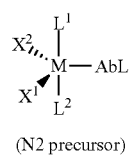

(N2 precursor)

where

M, $X^1$, $X^2$, $L^1$ and $L^2$ have the same general and preferred meanings as in the general formulae (N2a) and (N2b) and AbL means leaving ligand and can assume the same definitions as $L^1$ and $L^2$ as in the general formulae (N2a) and (N2b), and preferably represents a phosphine ligand with the definitions given for the general formulae (N2a) and (N2b), is reacted with a compound of the general formula (N1-Azo) at a temperature in the range from −20° C. to 100° C., preferably in the range from +10° C. to +80° C., more preferably in the range from +30 to +50° C., and at a molar ratio of the catalyst precursor compound of the general formula (XVII) to the compound of the general formula (N1-Azo) of 1:0.5 to 1:5, preferably 1:1.5 to 1:2.5, more preferably 1:2. Further examples for preparation of such catalysts of the formula (N) are present in EP-A-2 027 920.

A further alternative embodiment relates to an inventive metathesis catalysts of the general formula (O)

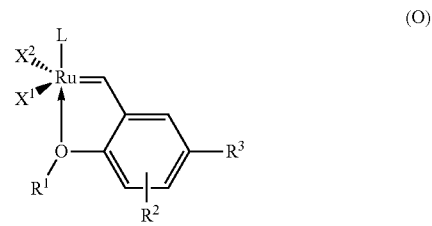

where $X^1$ and $X^2$ represent identical or different anionic ligands, preferably halogen, more preferably F, Cl, Br, I and especially preferably Cl, $R^1$ represents a linear or branched, aliphatic $C_1$-$C_{20}$-alkyl, $C_3$-$C_{20}$-cycloalkyl, $C_5$-$C_{20}$-aryl, $CHCH_3$—$CO$—$CH_3$, preferably methyl, ethyl, isopropyl, isoamyl, t-butyl, $CHCH_3$—$CO$—$CH_3$, cyclohexyl or phenyl, $R^2$ represents hydrogen, halogen, $C_1$-$C_6$-alkyl or $C_1$-$C_6$-alkenyl, $R^3$ an electron-withdrawing radical, preferably —F, —Cl, —Br, —I, —NO, —$NO_2$, —$CF_3$, —$OCF_3$, —CN, —SCN, —NCO, —CNO, —$COCH_3$, —$COCF_3$, —CO—$C_2F_5$, —$SO_3$, —$SO_2$—$N(CH_3)_2$, arylsulfonyl, arylsulfinyl, arylcarbonyl, alkylcarbonyl, aryloxycarbonyl, or —$NR^4$—CO—$R^5$ where $R^4$ and $R^5$ are the same or different and may each independently be H, $C_1$-$C_6$-alkyl, perhalogenated $C_1$-$C_6$-alkyl, aldehyde, ketone, ester, amide, nitrile, optionally substituted aryl, pyridinium-alkyl, pyridinium-perhaloalkyl or optionally substituted $C_5$-$C_6$ cyclohexyl, a $C_nH_{2n}Y$ or $C_nF_{2n}Y$ radical with n=1 to 6 and Y an ionic group or a radical of one of the formulae (EWG 1), (EWG 2) or (EWG 3)

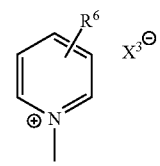

EWG 1

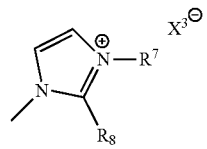

EWG 2

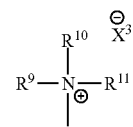

EWG 3 where $R^6$, $R^1$, $R^8$, $R^9$, $R^{10}$, $R^{11}$ independently represent H, $C_1$-$C_6$-alkyl, $C_1$-$C_6$-perhaloalkyl or $C_5$-$C_6$-aryl and $R^9$, $R^{10}$, $R^{11}$ may form a heterocycle, $X^3$ represents an anion, halogen, tetrafluoroborate ([BF$_4$]$^-$), [tetrakis(3,5-bis(trifluoromethyl)phenyl)borate]([BARF]$^-$), hexafluorophosphate ([PF$_6$]$^-$), hexafluoroantimonate ([SbF$_6$]$^-$), hexafluoroarsenate ([AsF$_6$]$^-$) or trifluoromethylsulfonate ([(CF$_3$)$_2$N]$^-$);

$R^4$ and $R^5$ together with the N and the C to which they are bonded may form a heterocycle of the formula (EWG 4) or (EWG 5)

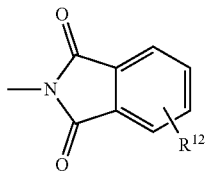

EWG 4

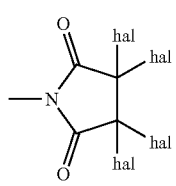

EWG 5 where hal is halogen and $R^{12}$ is hydrogen, $C_1$-$C_6$-alkyl, $C_5$-$C_6$-cycloalkyl or $C_5$-$C_6$-cycloaryl, L represents a ligand of the general formula (L1) or (L2)

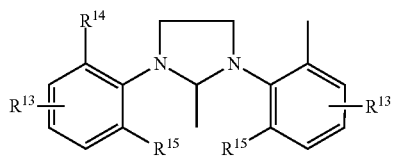

L1

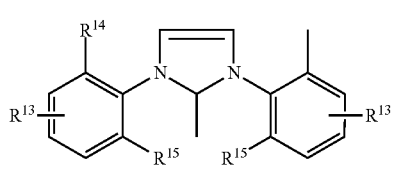

L2 where $R^{13}$ is hydrogen, $C_1$-$C_6$-alkyl, $C_3$-$C_{30}$-cycloalkyl or $C_5$-$C_{30}$-aryl, $R^{14}$ and $R^{15}$ are the same or different and are linear or branched $C_3$-$C_{30}$-alkyl, $C_3$-$C_{30}$-cycloalkyl, $C_5$-$C_{30}$-aryl, $C_5$-$C_{30}$-alkaryl, $C_5$-$C_{30}$-aralkyl, with optionally up to 3 heteroatoms, preferably isopropyl, i-butyl, tert-butyl, cyclohexyl or phenyl.

A further alternative embodiment relates to a metathesis catalysts of the general formula (P1)

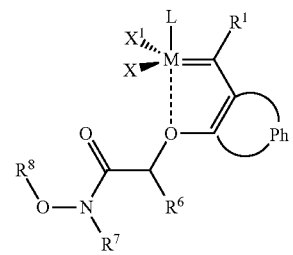

Formula (P1)

where

M is ruthenium or osmium;

X and $X^1$ are each independently anionic ligands,

L is a neutral ligand, $R^1$ is hydrogen, $C_1$-$C_{20}$ alkyl or $C_5$-$C_{10}$ aryl;

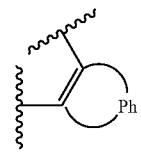

is an optionally substituted o-phenylene, wherein 2 or more substituents of the o-phenylene form an optionally substituted $C_4$-$C_8$ ring or an optionally substituted aromatic $C_5$-$C_{14}$ ring; and $R^6$, $R^7$, and $R^8$ are each independently hydrogen, $C_1$-$C_6$ alkyl, optionally substituted $C_4$-$C_{10}$ heterocycle or optionally substituted $C_5$-$C_{14}$ aryl; wherein $R^7$ and $R^8$ can form a substituted or unsubstituted $C_4$-$C_8$ cyclic system, or a metathesis catalyst of the general formula (P2)

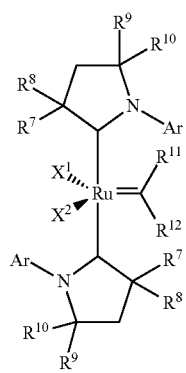

Formula (P2)

where $X^1$ and $X^2$ each independently represent an anionic ligand selected from the group consisting of halogen atom, —CN, —SCN, —OR', —SR', —O(C=O)R', —O(SO$_2$)R', and —OSi(R')$_3$, where R' is a $C_1$-$C_{12}$ alkyl, $C_3$-$C_{12}$ cycloalkyl, $C_2$-$C_{12}$ alkenyl, $C_5$-$C_{20}$ aryl, which is optionally substituted by at least one $C_1$-$C_{12}$ alkyl, $C_1$-$C_{12}$ perfluoroalkyl, $C_1$-$C_{12}$ alkoxy, $C_5$-$C_{24}$ aryloxy or $C_5$-$C_{20}$ heteroaryloxy;

Ar is an aryl group substituted by hydrogen atoms or optionally substituted by at least one $C_1$-$C_{12}$ alkyl, $C_1$-$C_{12}$ perfluoroalkyl, $C_1$-$C_{12}$ alkoxy, $C_5$-$C_{24}$ aryloxy, $C_{5-20}$ heteroaryloxy, or a halogen atom;

$R^7$, $R^8$, $R^9$, and $R^{10}$ are independently a hydrogen atom or $C_1$-$C_{12}$ alkyl, $R^7$ and/or $R^8$ may, together with $R^9$ and/or $R^{10}$, form a cyclic system, or independently represent $C_1$-$C_{12}$ alkyl, $C_3$-$C_{12}$ cycloalkyl, $C_2$-$C_{12}$ alkenyl, $C_5$-$C_{20}$ aryl, $C_1$-$C_5$ perfluoroalkyl, $C_7$-$C_{24}$ aralkyl, $C_5$-$C_{24}$ perfluoroaryl, which are optionally substituted by at least one $C_1$-$C_{12}$ alkyl, $C_1$-$C_{12}$ perfluoroalkyl, $C_1$-$C_{12}$ alkoxy, $C_5$-$C_{24}$ aryloxy, $C_{5-20}$ heteroaryloxy, or a halogen atom;

$R^{11}$, $R^{12}$ are each independently a hydrogen atom, halogen atom, an optionally substituted or unsubstituted $C_1$-$C_{25}$ alkyl, an optionally substituted or unsubstituted $C_1$-$C_{25}$ perfluoroalkyl, an optionally substituted or unsubstituted $C_2$-$C_{25}$ alkene, an optionally substituted or unsubstituted $C_3$-$C_7$ cycloalkyl, an optionally substituted or unsubstituted $C_2$-$C_{25}$ alkenyl, an optionally substituted or unsubstituted $C_3$-$C_{25}$ cycloalkenyl, an optionally substituted or unsubstituted $C_2$-$C_{25}$ alkynyl, an optionally substituted or unsubstituted $C_3$-$C_{25}$ cycloalkynyl, an optionally substituted or unsubstituted $C_1$-$C_{25}$ alkoxy, an optionally substituted or unsubstituted $C_5$-$C_{24}$ aryloxy, an optionally substituted or unsubstituted $C_5$-$C_{20}$ heteroaryloxy, an optionally substituted or unsubstituted $C_5$-$C_{24}$ aryl, an optionally substituted or unsubstituted $C_5$-$C_{20}$ heteroaryl, an optionally substituted or unsubstituted $C_7$-$C_{24}$ aralkyl, an optionally substituted or unsubstituted $C_{5-24}$ perfluoroaryl, or an optionally substituted or unsubstituted 3-12-membered heterocycle;

where substituents $R^{11}$ and $R^{12}$ may form a ring selected from the group consisting of $C_3$-$C_7$ cycloalkyl, $C_3$-$C_{25}$ cycloalkenyl, $C_3$-$C_{25}$ cycloalkynyl, $C_5$-$C_{24}$ aryl, $C_5$-$C_{20}$ heteroaryl, $C_5$-$C_{24}$ perfluoroaryl, 3-12-membered heterocycle which may independently be substituted by one and/or more substituents selected from the group consisting of hydrogen atom, halogen atom, $C_1$-$C_{12}$ alkyl, $C_1$-$C_{25}$ perfluoroalkyl, $C_2$-$C_{25}$ alkene, $C_3$-$C_7$ cycloalkyl, $C_2$-$C_{25}$ alkenyl, $C_3$-$C_{25}$ cycloalkenyl, $C_2$-$C_{25}$ alkynyl, $C_3$-$C_{25}$ cycloalkynyl, $C_1$-$C_{25}$ alkoxy, $C_5$-$C_{24}$ aryloxy, $C_5$-$C_{20}$ heteroaryloxy, $C_5$-$C_{24}$ aryl, $C_5$-$C_{20}$ heteroaryl, $C_7$-$C_{24}$ aralkyl, $C_5$-$C_{24}$ perfluoroaryl, and a 3-12-membered heterocycle, or
a metathesis catalyst of the general formula (P3)

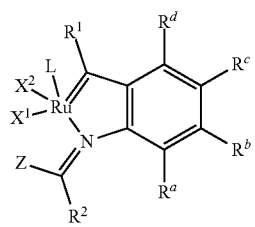

Formula (P3)

where
L is a neutral ligand;
$X^1$ and $X^2$ is independently an anionic ligand;
$R^1$, $R^2$, $R^a$, $R^b$, $R^c$, $R^d$ independently represent a hydrogen atom, a halogen atom, $C_1$-$C_{25}$ alkyl, $C_1$-$C_{25}$ perfluoroalkyl, $C_3$-$C_7$ cycloalkyl, $C_2$-$C_{25}$ alkenyl, $C_3$-$C_{25}$ cycloalkenyl, $C_2$-$C_{25}$ alkynyl, $C_3$-$C_{25}$ cycloalkynyl, $C_1$-$C_{25}$ alkoxy, $C_5$-$C_{24}$ aryl, $C_5$-$C_{20}$ heteroaryl, 3-12-membered heterocycle, ether (—OR'), thioether (—SR'), nitro (—NO$_2$), cyano (—CN), carboxyl (—COOH), ester (—COOR'), amide (—CONR'R''), sulfone (—SO$_2$R'), sulfonamide (—SO$_2$NR'R''), formyl or keto (—COR'), wherein R' and R'' are independently a hydrogen atom, $C_1$-$C_5$ alkyl, $C_1$-$C_5$ perfluoroalkyl, $C_5$-$C_{24}$ aryl, $C_5$-$C_{24}$ heteroaryl, $C_5$-$C_{24}$ perfluoroaryl;

Z independently represents a formyl or keto (—COR$^{Z'}$), carboxylic acid or ester (—COOR$^{Z'}$), thioester (—CSOR$^{Z'}$), nitro (—NO$_2$), amide (—CONR$^{Z'}$R$^{Z''}$), sulfone (—SO$_2$R$^{Z'}$), sulfonamide (—SO$_2$NR$^{Z'}$R$^{Z''}$), —CR$^{Z'}$R$_Z$''COR$^{Z'}$, —CR$^{Z'}$R$^{Z''}$COOR$^{Z'}$, —CR$^{Z'}$R$^{Z''}$CONR$^{Z'}$R$^{Z''}$, —CR$^{Z'}$R$^{Z''}$SO$_2$R$^{Z'}$ or —CR$^{Z'}$R$^{Z''}$SO$_2$NR$^{Z'}$R$^{Z''}$; where R$^{Z'}$ and R$^{Z''}$ independently represent a hydrogen atom, $C_1$-$C_5$ alkyl, $C_1$-$C_5$ perfluoroalkyl, $C_5$-$C_{24}$ aryl, $C_5$-$C_{24}$ heteroaryl or $C_5$-$C_{24}$ perfluoroaryl;

the anionic ligands $X^1$ and $X^2$ independently a halogen atom, —CN, —SCN, —OR$^4$, —SR$^4$, —O(C=O)R$^4$, —O(SO$_2$)R$^4$, —OP(O)R$_2^4$, —OSiR$_3^4$, wherein R$_4$ represents a $C_1$-$C_{12}$ alkyl, $C_3$-$C_{12}$ cycloalkyl, $C_2$-$C_{12}$ alkenyl, or $C_5$-$C_{20}$ aryl, which is optionally substituted by at least one $C_1$-$C_{12}$ alkyl, $C_1$-$C_{12}$ perhaloalkyl, $C_1$-$C_{12}$ alkoxy or a halogen atom; and the uncharged ligand L is selected from the group consisting of N-heterocyclic carbenes of the formulae 1a, 1b, 1c, 1d, 1e, 1f, 1g, 1h, 1i, 1j, 1k, 1l, 1m, 1n, 1o or 1p:

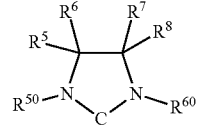

formula 1a

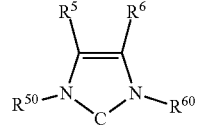

formula 1b

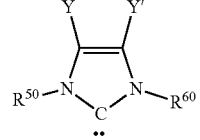

formula 1c

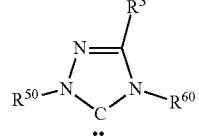

formula 1d

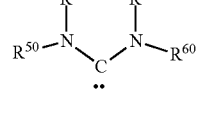

formula 1e formula 1f
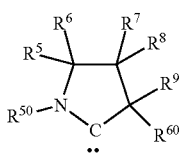

formula 1g
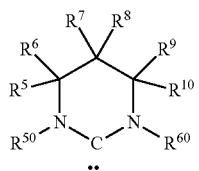

formula 1h
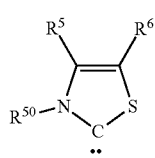

formula 1i
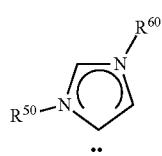

formula 1j
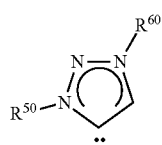

formula 1k
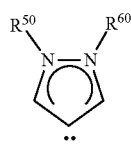

formula 1l
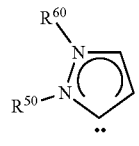

formula 1m
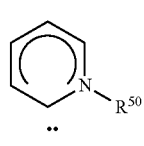

formula 1n
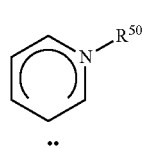

formula 1o
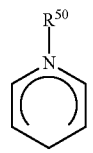

formula 1p
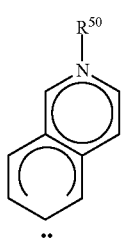

where $R^{50}$, $R^{60}$, $R^{70}$ and $R^{80}$ each independently represent $C_1$-$C_{12}$ alkyl, $C_3$-$C_{12}$ cycloalkyl, $C_2$-$C_{12}$ alkenyl, $C_5$-$C_{20}$ aryl, or $C_5$-$C_{20}$ heteroaryl, which is optionally substituted by at least one $C_1$-$C_{12}$ alkyl, $C_1$-$C_{12}$ perhaloalkyl, $C_1$-$C_{12}$ alkoxy or a halogen atom;

$R^5$, $R^6$, $R^7$, $R^8$, $R^9$ and $R^{10}$ each independently represent a hydrogen atom, $C_1$-$C_{12}$ alkyl, $C_3$-$C_{12}$ cycloalkyl, $C_2$-$C_{12}$ alkenyl, $C_5$-$C_{20}$ aryl, or $C_5$-$C_{20}$ heteroaryl, which is optionally substituted by at least one $C_1$-$C_{12}$ alkyl, $C_1$-$C_{12}$ perhaloalkyl, $C_1$-$C_{12}$ alkoxy or a halogen atom;

and each substituent selected from the group comprising $R^5$, $R^6$, $R^7$, $R^8$, $R^9$ and $R^{10}$ and also $R^{50}$, $R^{60}$, $R^{70}$ and $R^{80}$ may optionally form a cyclic or macrocyclic system with one another.

A further embodiment of the invention relates to a metathesis catalysts of the general formula (Q)

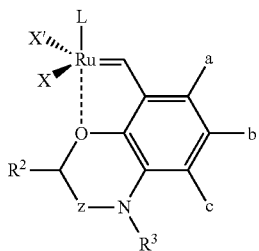

Formula (Q)

where

X and $X^1$ are each independently halogens, preferably selected from the group consisting of Cl, Br and I, L is an uncharged ligand of the formula $L^1$, $L^2$, $L^3$ or $L^4$,

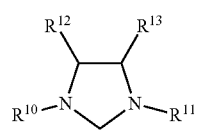

($L^1$)

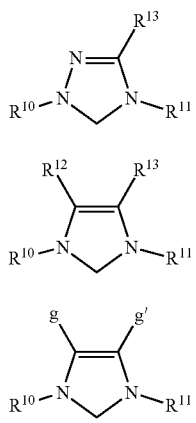
(L²)

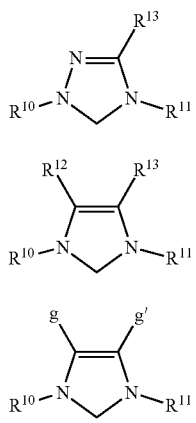
(L³)

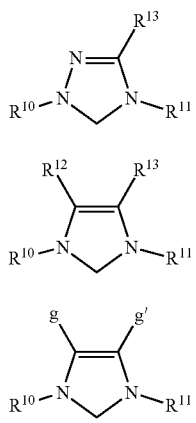
(L⁴)

where $R^{10}$ and $R^{11}$ are each independently a substituted or unsubstituted side chain comprising 1 to 30 carbon atoms and optionally comprising one or more functional groups, and where $R^{12}$ and $R^{13}$ are each independently H, $C_{1-6}$ alkyl, optionally substituted by an alkoxy radical $OR^{15}$, or aryl optionally substituted by an alkoxy radical $OR^{15}$, or form a 3- or 4-membered alkene bridge, and wherein $R^{15}$ is selected from the group consisting of $C_{1-20}$ alkyl, aryl and $C_{7-18}$ aralkyl, and wherein g and g' are in each case halogens, z is a methyl or carbonyl group, a, b and c are in each case H;

$R^2$ is selected from the group consisting of H, $C_{1-12}$ alkyl, preferably methyl, ethyl or isopropyl, $C_{5-12}$ cycloalkyl, $C_{7-18}$ aralkyl or aryl; and $R^3$ is selected from the group consisting of H, $C_{1-12}$ alkyl, $C_{1-12}$ cycloalkyl, $C_{7-18}$ aralkyl, aryl, $C_{1-12}$ haloalkyl, $C_{1-12}$ ammonium alkyl, $C_{1-12}$ pyridinium alkyl, $C_{1-12}$ aldehyde alkyl, $C_{1-12}$ nitroalkyl, nitrile or a radical selected from the group consisting of ketones $COR^4$, esters $CO_2R^4$, oxalates $COCO_2R^4$, sulfones $SO_2R^4$ or amides $CONHR^4$, where $R^4$ is selected from the group consisting of H, $C_{1-12}$ alkyl, $C_{5-12}$ cycloalkyl, $C_{7-18}$ aralkyl, aryl, $C_{1-12}$ haloalkyl, $C_{1-12}$ ammonium alkyl, $C_{1-12}$ pyridinium alkyl, $C_{1-12}$ aldehyde alkyl, $C_{1-12}$ nitroalkyl and nitrile, or $R^3$ is a side chain of the formula $R^{3c}$, $R^{3d}$, $R^{3e}$, $R^{3f}$, $R^{3g}$, $R^{3h}$, $R^{3i}$, $R^{3j}$, $R^{3k}$, $R^{3l}$, $R^{3m}$, $R^{3n}$, $R^{3o}$ or $R^{3p}$:

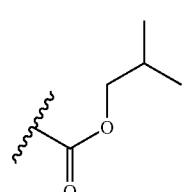
(R³ᶜ)

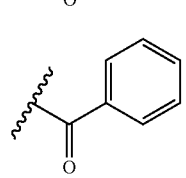
(R³ᵈ)

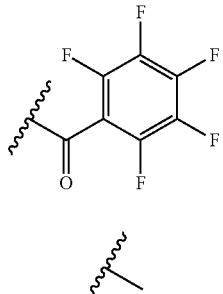
(R³ᵉ)

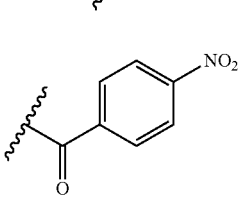
(R³ᶠ)

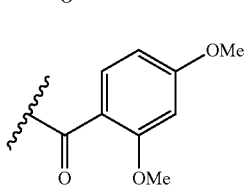
(R³ᵍ)

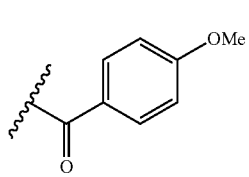
(R³ʰ)

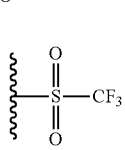
(R³ⁱ)

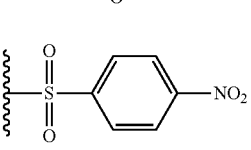
(R³ʲ)

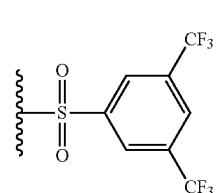
(R³ᵏ)

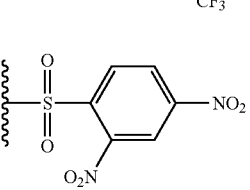
(R³ˡ)

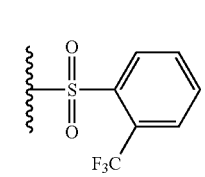
(R³ᵐ)

(R³ⁿ)

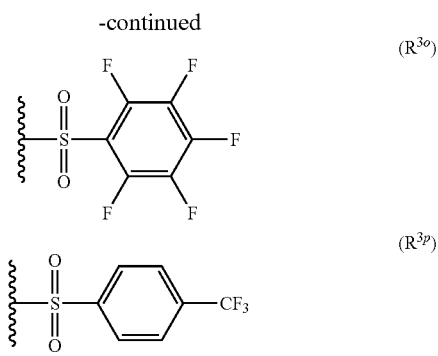

or, if z is methyl, $R^3$ is a side chain of the formula $R^{3a}$ or $R^{3b}$:

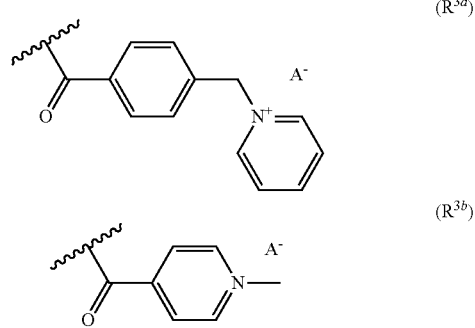

where $A^-$ is selected from the group consisting of $F^-$, $Cl^-$, $Br^-$, $I^-$, tetrafluoroborate $BF_4^-$, hexafluorophosphate $PF_6^-$ and bis(trifluoromethylsulfonyl)amide $NTf_2^-$.

Very preferred metathesis catalysts are selected from the group consisting of Grubbs I catalyst of the structure (IV), Grubbs II catalyst of the structure (V), Zhan 1B catalyst of the structure (XV), Grela catalyst of the structure (XVI), Grubbs-Hoveyda II catalyst of the structure (VII).

Most preferred are the Grubbs-Hoveyda II catalyst and the Grubbs II catalyst. The very most preferred is the Grubbs-Hoveyda II catalyst.

The amount of the catalyst used in accordance with the invention for the metathesis reaction is dependent on the nature and also the catalytic activity of the specific catalyst. The amount of catalyst used is 0.001 phr to 1 phr, preferably 0.005 phr to 0.1 phr, especially 0.008 phr to 0.05 phr, based on the nitrile-diene copolymer used.

The metathesis reaction of nitrile-diene copolymer can be conducted without, or else in the presence of, a co-olefin. This is preferably a straight-chain or branched $C_2$-$C_{16}$ olefin. Suitable examples are ethylene, propylene, isobutene, styrene, 1-hexene or 1-octene. Preference is given to using 1-hexene or 1-octene.

Co-olefins having two or more double bonds or containing a double bond and a carboxylic acid group or hydroxyl group are also suitable. If the co-olefin is liquid (for instance 1-hexene), the amount of the co-olefin is preferably within a range from 0.2% by weight to 20% by weight, based on the nitrile-diene copolymer used. If the co-olefin is a gas, for instance ethylene, the amount of the co-olefin is chosen such that a pressure in the range from $1 \times 10^5$ Pa to $1 \times 10^7$ Pa is established in the reaction vessel at room temperature, preferably a pressure in the range from $5.2 \times 10^5$ Pa to $4 \times 10^6$ Pa.

The process according to the invention for preparation of solutions of hydrogenated nitrile-diene copolymer is effected an ether-containing or ketone-containing solvent mixture.

Preferably, the process according to the invention for preparation of solutions of hydrogenated nitrile-diene copolymer is effected a CPME-containing solvent mixture or an MEK-containing solvent mixture.

In the context of this invention, suitable ether-containing solvents are compounds of the general formula $R^1$—O—$R^2$ where $R^1$ and $R^2$ each independently represent a linear or branched or cyclic alkyl having 1 to 20 carbon atoms, preferably having 1 to 6 carbon atoms. $R^1$ and $R^2$ may also be joined to form a ring having 3 to 12 carbon atoms. Preferred ether-containing solvents are CPME, tetrahydrofuran, tetrahydropyran or dioxane. A particularly preferred ether-containing solvent is CPME. CPME has a high boiling point of 106° C. compared to other ethers and hence enables particularly safe handling.

In the context of this invention, suitable ketone-containing solvents are compounds of the general formula $R^3$—CO—$R^4$ where $R^3$ and $R^4$ each independently represent a linear or branched or cyclic alkyl having 1 to 20 carbon atoms, preferably having 1 to 6 carbon atoms. $R^3$ and $R^4$ may also be joined to form a ring having 3 to 12 carbon atoms. Preferred ketone-containing solvents are methyl ethyl ketone (MEK) and acetone. A particularly preferred ketone-containing solvent is MEK. MEK has a higher boiling point of 80° C. compared to acetone and hence enables particularly safe handling.

As further solvent, the ether-containing or ketone-containing solvent mixtures according to the invention preferably contain monochlorobenzene (MCB), dichloromethane, benzene, dichlorobenzene, toluene, cyclohexane, dimethyl sulfoxide (DMSO) or a co-olefin other than 1-hexene.

In a preferred process according to the invention, CPME and MEK are used in a ratio of 10:1 to 1:10, preferably in a ratio of 6:1 to 1:1. In an alternative process, CPME and MCB are used in a ratio of 10:1 to 1:10, preferably in a ratio of 1:1 to 1:6.

The concentration of the nitrile-diene copolymer used in the reaction mixture for the metathesis reaction is not critical, but care should of course be taken to ensure that the reaction is not adversely affected by much too high a viscosity of the reaction mixture and the associated mixing problems. Preferably, the concentration of the nitrile-diene copolymer in the reaction mixture is in the range from 1% by weight to 20% by weight, more preferably in the range from 5% by weight to 15% by weight, based on the overall reaction mixture.

The metathesis reaction is typically conducted at a temperature in the range from 10° C. to 150° C., preferably in the range from 20° C. to 100° C.

The reaction time depends on a number of factors, for example on the type of nitrile-diene copolymer, the type of catalyst, the catalyst concentration used and the reaction temperature, and is typically 1 to 24 hours. The progress of the metathesis reaction can be monitored by standard analysis, for example can be followed by GPC measurements or by determining the viscosity.

The metathesis reaction process according to the invention is followed by a hydrogenation of the degraded nitrile-diene copolymer obtained. Alternatively, the hydrogenation can also be effected simultaneously with the metathesis reaction as what is called a tandem reaction. This can be effected in the manner known to those skilled in the art.

In the context of this invention, "hydrogenation" is understood to mean a conversion of the double bonds present in the nitrile-diene copolymer to be hydrogenated to an extent of at least 50%, preferably 70-100%, more preferably 80 to 100%.

It is possible to conduct the hydrogenation using homogeneous or heterogeneous hydrogenation catalysts. It is also possible to conduct the hydrogenation in situ, i.e. in the same reaction vessel in which the metathesis reaction was also effected beforehand, and without any need to isolate the degraded nitrile-diene copolymer. It is also possible to conduct the hydrogenation under the described conditions according to the invention without preceding metathesis by contacting the NBR solution with the catalysts directly with hydrogen. The metathesis catalysts remaining in the reaction vessel from the metathesis reaction are found to be particularly efficient under the conditions according to the invention and can bring the hydrogenation to full hydrogenation within a short time.

In addition, as well as CPME, it is also possible for one or more further solvents to be present. Further solvents that are suitable in principle for hydrogenation of NBR to HNBR are also known from DE-A-25 39 132 and EP-A-0 471 250.

The practical conduct of this hydrogenation is sufficiently well-known to those skilled in the art, for example from U.S. Pat. No. 6,683,136. It is effected by contacting the nitrile-diene copolymer to be hydrogenated with hydrogen in an ether-containing or ketone-containing solvent mixture according to the invention at a temperature in the range from 100° C. to 150° C. and a pressure in the range from 50 bar to 150 bar for 2 hours to 10 hours.

On conclusion of the hydrogenation, a hydrogenated nitrile-diene copolymer having a Mooney viscosity (ML 1+4 at 100° C.), measured to ASTM Standard D 1646, in the range from 10 to 50, preferably from 10 to 30, is obtained. This corresponds to a weight-average molecular weight Mw in the range from 2000 g/mol to 400 000 g/mol, preferably in the range from 20 000 g/mol to 200 000 g/mol. The resultant hydrogenated nitrile-diene copolymer also has a polydispersity PDI=Mw/Mn, where Mw represents the weight-average and Mn the number-average molecular weight, in the range from 1 to 5 and preferably in the range from 1.5 to 3.

Mw [g/mol]: weight-average molecular weight
Mn [g/mol]: number-average molecular weight
PDI: breadth of the molecular weight distribution (Mw/Mn)

After the hydrogenation, the solution of the hydrogenated nitrile-diene copolymer (HNBR solution) produced can be subjected at least to a purification step.

Examples of suitable methods of purification include those for removal of the precious metal-containing catalysts, which can have an adverse effect on the finished polymer. One way of effectively reducing the level of precious metals is by passing the HNBR-containing solution through a suitable resin bed (more specifically ion exchanger) that binds the precious metals.

A further means of purifying the polymer involves precipitation in a suitable organic solvent in which the polymer is insoluble but impurities are soluble.

Also suitable is the method of ultrafiltration, in which impurities can be separated from the polymer solution down to a particular maximum size by a membrane method.

The invention therefore further relates to an HNBR solution comprising hydrogenated nitrile-diene copolymer in CPME-containing solvent having a molecular weight (Mw) of 100 000 g/mol or less, preferably 50 000 g/mol or less and more preferably 20 000 g/mol or less.

The concentration of the hydrogenated nitrile-diene copolymer in the HNBR solution is typically in the range from 1% by weight to 20% by weight, more preferably in the range from 5% by weight to 15% by weight, based on the overall HNBR solution.

The HNBR solution according to the invention typically has an Ru content of 1 to 500 ppm, preferably of 2 to 350 ppm and most preferably of 5 to 150 ppm.

The HNBR solution according to the invention typically has an Fe content of 0 to 2000 ppm, preferably of 0 to 1000 ppm and most preferably of 0 to 500 ppm.

The HNBR solution according to the invention typically has an Rh content of 0 to 350 ppm, preferably of 0 to 100 ppm and most preferably of 0 to 50 ppm.

The invention further relates to the use of the HNBR solutions according to the invention as binder, preferably as binder for production of electrodes, more preferably as binder for production of cathodes.

The particular advantage of the invention is that HNBR solutions of hydrogenated nitrile-diene copolymers having low molecular weights of 100 000 g/mol or less, preferably 50 000 g/mol or less and more preferably 20 000 g/mol or less are provided.

The present invention is demonstrated by the following non-limiting examples.

Examples

The following materials were used.
Grubbs-Hoveyda II catalyst [1,3-bis(2,4,6-trimethylphenyl)-2-imidazolidinylidene]dichloro(o-isopropoxyphenylmethylene)ruthenium (CAS Number: 301224-40-8); $C_{31}H_{38}Cl_2N_2ORu$, weight: 626.62 g/mol; (commercially available from Umicore)

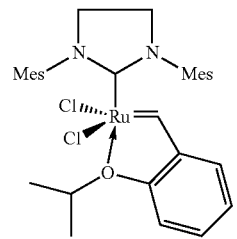

Grubbs II catalyst benzylidene[1,3-bis(2,4,6-trimethylphenyl)-2-imidazolidinylidene]dichloro(tricyclohexylphosphine)ruthenium (CAS Number: 246047-72-3); $C_{46}H_{65}Cl_2N_2PRu$; weight: 848.97 g/mol; (commercially available from Umicore)

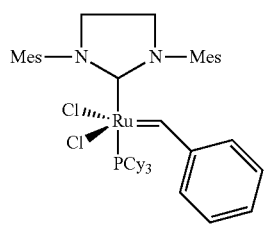

Wilkinson catalyst—chloridotris(triphenylphosphine)rhodium(I) (CAS Number: 14694-95-2); $C_{54}H_{45}ClP_3Rh$, weight: 925.24 g/mol; (commercially available from Umicore)

Nitrile-diene copolymer (NBR)—Perbunan® 3431 ACN content: 34% by weight; Mooney viscosity: 35 MU; Mw: 268.326; commercially available from ARLANXEO Deutschland GmbH Monochlorobenzene (MCB)—CAS No. 108-90-7 (commercially available from Merck)

Cyclopentyl methyl ether (CPME)—CAS No. 5614-37-9 (commercially available from Merck)

Methyl ethyl ketone (MEK)—CAS No. 78-93-3 (commercially available from Merck)

1-Hexene—CAS No. 592-41-6 (commercially available from Merck)

The residual double bond content of the hydrogenated nitrile-diene copolymers obtained was determined in customarily to ASTM D 5670-95.

The molecular weight is determined by gel permeation chromatography (GPC). A modular system was used, having a Shodex RI-71 differential refractometer, S 5200 autosampler (from SFD), column oven (ERC-125), Shimadzu LC 10 AT pump and a column combination of 3 PLgel 10 μm Mixed B 300×7.5 mm columns from Agilent. The solvent used was tetrahydrofuran; the molecular weights present are based on polystyrene standards from PSS (Mainz). The finished THF sample solutions are filtered through syringe filters having 0.45 μm PTFE membranes and diameter 25 mm. The measurements were conducted at 40° C. and a flow rate of 1 ml/min in tetrahydrofuran.

The molecular parameters such as number-average molecular weight Mn, mass-average molecular weight $M_w$ and the resulting polydispersity index PDI are determined from the RI signal by means of the "Empower 2 data base" software from Waters.

Nitrile-diene copolymer (Perbunan® 3435) was converted in the presence of the specified amount of the specified catalyst at 120° C. for up to 5 hours or until hydrogenation was complete.

The nitrile-diene copolymer was dissolved in the appropriate solvent with a concentration of 13% by weight. This solution and 6 phr of 1-hexene dissolved in MCB were transferred into a 2 l autoclave with a gas inlet and stirrer and inertized with nitrogen. At a stirrer speed of 600 min$^{-1}$ and a temperature of 30° C., the catalyst solution consisting of 0.015 phr of Grubbs-Hoveyda II catalyst dissolved in MCB was installed under a gentle nitrogen counterflow. The glass burette was charged with nitrogen to 5 bar and the catalyst solution was transferred into the reactor. The concentration of the nitrile-diene copolymer during the metathesis was 10%. After a reaction time of 18 h, the reactor was heated up to 120° C. at a stirrer speed of 600 min$^{-1}$ and with a nitrogen pressure of <0.5 bar, and the hydrogen pressure was increased stepwise up to 84 bar. The progress of the reaction was monitored via the measurement of the residual double bond content. After the end of the reaction, the reactor was cooled down to room temperature, decompressed gradually and purged with nitrogen, before the solution of the hydrogenated nitrile-diene copolymer was discharged.

TABLE 1

Overview of hydrogenations 1 to 11 conducted

| | | Metathesis | | | Hydrogenation | | | | |
|---|---|---|---|---|---|---|---|---|---|
| No. | Solvent | Cat. | Amount [phr] | Hexene [phr] | Cat. | Amount [phr] | Time** [h] | RDB [%] | Mw [g/mol] |
| 1 | 100% MCB | — | — | — | W | 0.065 | 2 | 1.0 | 336466 |
| 2 | 85% CPME 15% MEK | G II | 0.02 | 6 | W | 0.090 | 6 | 5.6 | 11706 |
| 3 | 85% CPME 15% MEK | — | — | — | W | 0.065 | 4 | 3.7 | 316553 |
| 4 | 50% MCB 50% CPME | — | — | — | W | 0.065 | 3 | 0.5 | 314865 |
| 5 | 100% MCB | GH II | 0.015 | 6 | — | — | 6 | 7.3 | 20832 |
| 6* | 85% CPME 15% MEK | GH II | 0.015 | 6 | — | — | 3 | 0.4 | 17046 |
| 7* | 85% MCB 15% MEK | GH II | 0.015 | 6 | — | — | 3 | 0.5 | 15217 |
| 8* | 50% MCB 50% MEK | GH II | 0.015 | 6 | — | — | 5 | 0.6 | 28499 |
| 9* | 50% MCB 50% CPME | GH II | 0.015 | 6 | — | — | 2 | 0.4 | 13924 |
| 10* | 85% MCB 15% CPME | GH II | 0.015 | 6 | — | — | 3 | 0.5 | 11610 |
| 11 | 100% MEK | GH II | 0.015 | 6 | — | — | 5 | 0.8 | 53809 |

GH II = Grubbs-Hoveyda II catalyst;

W = Wilkinson catalyst;

*inventive examples;

**reaction time until an RDB content of <1 was attained or until the reaction stopped without reaching an RDB content of <1.

The hydrogenation efficiency of the Rh-based catalysts known from the prior art, such as the Wilkinson catalyst, is lower in such alternative solvent mixtures than in monochlorobenzene (MOB).

Inventive processes 6* to 10* have both complete hydrogenation (<1%) within a short time (5 hours or less) and a distinct reduction in molecular weight to <100 000 g/mol.

Inventive processes in which CPME or MEK was used as solvent (6*, 7*, 8*, 9*, 10*) have particularly low molecular weights (<20 000 g/mol) within a particularly short time (3 hours or less) and particularly low RDB values (0.5 or less).

Having thus described the present invention and the advantages thereof, it should be appreciated that the various aspects and embodiments of the present invention as disclosed herein are merely illustrative of specific ways to make and use the invention.

The various aspects and embodiments of the present invention do not limit the scope of the invention when taken into consideration with the appended claims and the foregoing detailed description.

What is desired to be protected by Letters Patent is set forth in the following claims:

1. A process for preparing a solution of a hydrogenated nitrile-diene copolymer, said process comprising:
   (i) providing a nitrile-diene copolymer;
   (ii) providing a solvent mixture comprising: a first solvent comprising one or more members selected from the group consisting of monochlorobenzene, dichloromethane, benzene, dichlorobenzene, toluene, cyclohexane, and ketone-containing solvents of the general formula $R^3$—CO—$R^4$ where $R^3$ and $R^4$ each independently represent a linear or branched or cyclic alkyl having 1 to 20 carbon atoms; and a second solvent selected from cyclopentyl methyl ether (CPME);
   (iii) dissolving the nitrile-diene copolymer according to (i) in the solvent mixture according to (ii) to form a solution; and
   (iv) subjecting the solution formed in (iii) to hydrogenation to produce the hydrogenated nitrile-diene copolymer;
   wherein the hydrogenation is conducted in the presence of a metathesis catalyst selected from the group consisting of Grubbs I catalyst of the structure (IV), Grubbs II catalyst of the structure (V), Zhan 1B catalyst of the structure (XV), Grela catalyst of the structure (XVI), and Grubbs-Hoveyda II catalyst of the structure (VII):

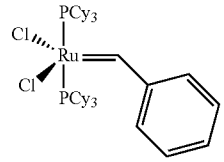

(IV)

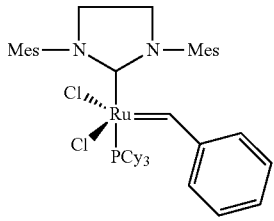

(V)

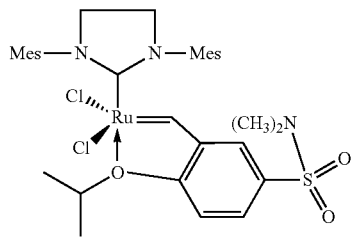

(XV)

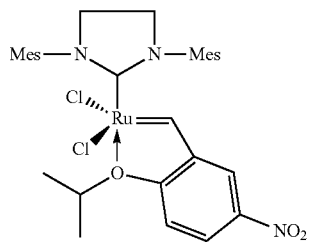

(XVI)

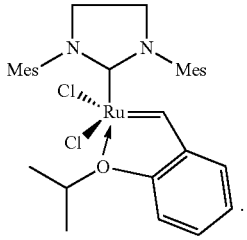

(VII)

2. The process according to claim 1, wherein the ketone-containing solvent is a compound of the general formula $R^3$—CO—$R^4$ where $R^3$ and $R^4$ each independently represent a linear or branched or cyclic alkyl having 1 to 20 carbon atoms.

3. The process according to claim 1, wherein a ratio of CPME to other solvents in the solvent mixture is in a range of 10:1 to 1:10.

4. The process according to claim 1, wherein the nitrile-diene copolymer is dissolved in the solvent mixture in a concentration of from 1% by weight to 20% by weight.

5. The process according to claim 1, wherein an amount of metathesis catalyst is 0.001 phr to 1 phr, based on the nitrile-diene copolymer used.

6. The process according to claim 1, wherein the hydrogenation takes place at a temperature of 100° C. to 150° C.

7. The process according to claim 1, wherein the hydrogenation is conducted at a pressure in a range of 50 bar to 150 bar.

8. The process according to claim 1, wherein the nitrile-diene copolymer, as well as nitrile monomer units and diene monomer units, as further monomer unit, contains an α,β-ethylenically unsaturated carboxylic ester unit, a PEG acrylate unit, or an α,β-ethylenically unsaturated carboxylic acid unit.

9. The process according to claim 1, wherein the hydrogenated nitrile-diene copolymer has a molecular weight (Mw) of 100 000 g/mol or less.

* * * * *